United States Patent
Tanaka et al.

(10) Patent No.: US 11,441,215 B2
(45) Date of Patent: *Sep. 13, 2022

(54) GRAIN-ORIENTED ELECTRICAL STEEL SHEET AND METHOD FOR PRODUCING GRAIN-ORIENTED ELECTRICAL STEEL SHEET

(71) Applicant: NIPPON STEEL CORPORATION, Tokyo (JP)

(72) Inventors: Ichiro Tanaka, Tokyo (JP); Takashi Kataoka, Tokyo (JP); Noriyoshi Kubota, Tokyo (JP); Kazutoshi Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/981,585

(22) PCT Filed: Mar. 22, 2019

(86) PCT No.: PCT/JP2019/012252
§ 371 (c)(1),
(2) Date: Sep. 16, 2020

(87) PCT Pub. No.: WO2019/182149
PCT Pub. Date: Sep. 26, 2019

(65) Prior Publication Data
US 2021/0054489 A1    Feb. 25, 2021

(30) Foreign Application Priority Data
Mar. 22, 2018    (JP) .............................. JP2018-054675

(51) Int. Cl.
*C22C 38/60* (2006.01)
*C21D 8/02* (2006.01)
(Continued)

(52) U.S. Cl.
CPC ............ *C22C 38/60* (2013.01); *C21D 8/0205* (2013.01); *C21D 8/0226* (2013.01);
(Continued)

(58) Field of Classification Search
None
See application file for complete search history.

(56) References Cited

U.S. PATENT DOCUMENTS 4,698,272 A    10/1987    Inokuti et al.
6,461,741 B1   10/2002    Takeda et al.

FOREIGN PATENT DOCUMENTS

CN    1236824 A       12/1999
EP    0215134 A1      3/1987
(Continued)

OTHER PUBLICATIONS

"Methods of measurement of the magnetic properties of magnetic steel sheet and strip by means of a single sheet tester", JIS C 2556, 1996, total 6 pages.
(Continued)

*Primary Examiner* — Xiaobei Wang
(74) *Attorney, Agent, or Firm* — Birch, Stewart, Kolasch & Birch, LLP

(57) ABSTRACT

A grain-oriented electrical steel sheet includes: a base steel sheet including, as a chemical composition, by mass %, C: 0.010% or less, Si: 2.50% to 4.00%, Mn: 0.050% to 1.000%, S+Se: 0.005% or less in total, Sol. Al: 0.005% or less, N: 0.005% or less, Bi+Te+Pb: 0% to 0.0300% in total, Sb: 0% to 0.50%, Sn: 0% to 0.50%, Cr: 0% to 0.50%, Cu: 0% to 1.0%, and a remainder of Fe and impurities; and a tension-applying insulation coating provided on a surface of the base steel sheet, in which, on the surface of the base steel sheet, an arithmetic average roughness Ra along a rolling 90° direction that is a direction perpendicular to a rolling direc-
(Continued)

tion is 0.60 μm or less, and when a cross section of the base steel sheet is observed along the rolling 90° direction, recessed parts having a depth of 0.1 μm or more and 2.0 μm or less are present on the surface of the base steel sheet in 1.0/100 μm or more and 6.0/100 μm or less.

3 Claims, 4 Drawing Sheets

(51) Int. Cl.
*C21D 9/46* (2006.01)
*C22C 38/00* (2006.01)
*C22C 38/02* (2006.01)
*C22C 38/04* (2006.01)
*C22C 38/06* (2006.01)
*C22C 38/20* (2006.01)

(52) U.S. Cl.
CPC ............ *C21D 8/0236* (2013.01); *C21D 9/46* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/20* (2013.01)

(56) References Cited

FOREIGN PATENT DOCUMENTS

| | | |
|---|---|---|
| EP | 0406833 A1 | 1/1991 |
| EP | 0 565 029 A1 | 10/1993 |
| EP | 0 959 142 A2 | 11/1999 |
| JP | 62-1820 A | 1/1987 |
| JP | 5-311453 A | 11/1993 |
| JP | 6-116642 A | 4/1994 |
| JP | 2001-303215 A | 10/2001 |
| JP | 2002-249880 A | 9/2002 |
| JP | 2003-313644 A | 11/2003 |
| JP | 4569070 B | 10/2010 |
| JP | 2018-3049 A | 1/2018 |

OTHER PUBLICATIONS

"Test methods for electrical steel strip and sheet—Part 1: Methods of measurement of the magnetic properties of electrical steel strip and sheet by means of an Epstein frame", JIS C 2550-1, 2011, total 8 pages.

Geometrical Product Specifications (GPS)—Surface texture: Profile method—Terms, definitions and surface texture parameters, JIS B 0601, 2013, total 27 pages.

GRAIN-ORIENTED ELECTRICAL STEEL SHEET AND METHOD FOR PRODUCING GRAIN-ORIENTED ELECTRICAL STEEL SHEET

TECHNICAL FIELD OF THE INVENTION

The present invention relates to a grain-oriented electrical steel sheet and a method for producing a grain-oriented electrical steel sheet.

Priority is claimed on Japanese Patent Application No. 2018-054675, filed Mar. 22, 2018, the content of which is incorporated herein by reference.

RELATED ART

A grain-oriented electrical steel sheet is a steel sheet that contains silicon (Si) in an amount of about 0.5 to 7 mass % and has crystal orientations integrated in an {110}<001> orientation (Goss orientation) by utilizing a phenomenon called secondary recrystallization, and is mainly used for iron cores of transformers or the like as a soft magnetic material. Since the characteristics of grain-oriented electrical steel sheets greatly affect the performance of transformers, intensive studies have been conducted on grain-oriented electrical steel sheets in order to achieve good excitation characteristics and low iron loss characteristics.

A general method for producing a grain-oriented electrical steel sheet is as follows.

First, a steel piece having a predetermined chemical composition is heated and hot-rolled to produce a hot-rolled steel sheet. After performing hot-rolled sheet annealing on the obtained hot-rolled steel as necessary, the hot-rolled steel sheet is pickled. Cold rolling is performed on the hot-rolled steel sheet after the pickling to produce a cold-rolled steel sheet. Decarburization annealing is performed on the obtained cold-rolled steel sheet to develop primary recrystallization.

Thereafter, an aqueous slurry containing an annealing separator containing MgO as a primary component is applied to the surface of the cold-rolled steel sheet after the decarburization annealing, and dried. Thereafter, the steel sheet is coiled into a coil and subjected to final annealing to develop secondary recrystallization. During the final annealing, simultaneously with the development of secondary recrystallization in the steel sheet, MgO in the annealing separator reacts with $SiO_2$ in an internal oxide layer formed on the surface of the cold-rolled steel sheet during the decarburization annealing, such that a primary coating (also referred to as a "glass coating") containing forsterite ($Mg_2SiO_4$) as a primary component is formed on the surface of the steel sheet.

After the final annealing (after forming the glass coating), a tension-applying insulation coating (also referred to as a "secondary coating") is formed as a further upper layer by applying a solution containing, for example, colloidal silica and phosphate as primary components, and baking.

The glass coating has, in addition to a function as an insulation coating, a function of improving the adhesion of the tension-applying insulation coating as the further upper layer formed on of the glass coating, and the iron loss is reduced by the tension of both the glass coating and the tension-applying insulation coating. However, the glass coating is a non-magnetic phase and is not preferable from the viewpoint of magnetic characteristics. In addition, the interface between the steel sheet and the glass coating has a root-like structure in which the roots of the glass coating are intricate, and may cause an increase in iron loss through inhibition of domain wall movement in some cases. In a case where the root-like structure is reduced, the adhesion between the glass coating and the steel sheet deteriorates, and as a result, the adhesion of the tension-applying insulation coating also deteriorates. Therefore, in a case where the surface of the steel sheet is smoothed by removing the glass coating or suppressing the formation of the glass coating, although excellent magnetic characteristics are obtained, the adhesion of the tension-applying insulation coating further deteriorates.

In a grain-oriented electrical steel sheet having no such glass coating, as means for improving the adhesion of the tension-applying insulation coating, for example, Patent Document 1 discloses a technique of washing a steel sheet by immersing the steel sheet in an aqueous solution containing sulfuric acid or a sulfate salt in a sulfuric acid concentration of 2% to 30% before applying a tension-applying insulation coating. Patent Document 2 discloses a technique of forming a tension-applying insulation coating after performing a pretreatment on the surface of a steel sheet using an oxidizing acid when the tension-applying insulation coating is applied. Patent Document 3 discloses a grain-oriented silicon steel sheet having an external oxidation type oxide film primarily containing silica and containing metal iron having a cross-sectional area ratio of 30% or less in the external oxidation type oxide film. Patent Document 4 discloses a grain-oriented electrical steel sheet having fine streaky grooves having a depth of 0.05 μm or more and 2 μm or less directly applied to the surface of the base of the grain-oriented electrical steel sheet at intervals of 0.05 μm or more and 2 μm or less.

The tension-applying insulation coating formed on the surface of the grain-oriented electrical steel sheet having no glass coating may peel off while being left as it is in a case where the adhesion is poor. From the viewpoint of achieving industrially stable production of a grain-oriented electrical steel sheet, it is extremely important to improve the adhesion of the tension-applying insulation coating. In this regard, although the techniques disclosed in Patent Documents 1 to 4 are all intended to improve the adhesion of the tension-applying insulation coating, it is not always clear whether or not a stable iron loss reduction effect is obtained by the techniques disclosed in Patent Documents 1 to 4, and there is still room for examination.

PRIOR ART DOCUMENT

Patent Document

[Patent Document 1] Japanese Unexamined Patent Application, First Publication No. H5-311453

[Patent Document 2] Japanese Unexamined Patent Application, First Publication No. 2002-249880

[Patent Document 3] Japanese Unexamined Patent Application, First Publication No. 2003-313644

[Patent Document 4] Japanese Unexamined Patent Application, First Publication No. 2001-303215

DISCLOSURE OF THE INVENTION

Problems to be Solved by the Invention

The present invention has been made in view of the above problems. An object of the present invention is to provide, in a grain-oriented electrical steel sheet having no glass coating, a grain-oriented electrical steel sheet having a tension-applying insulation coating with excellent adhesion and having excellent magnetic characteristics, and a method for producing a grain-oriented electrical steel sheet capable of industrially stably producing the grain-oriented electrical steel sheet.

Means for Solving the Problem

As a method for obtaining a grain-oriented electrical steel sheet having no glass coating, a method for removing a generated glass coating by chemical polishing or electrolytic polishing, and the like are known. However, from the viewpoint of productivity, it is preferable to obtain a grain-oriented electrical steel sheet having no glass coating by suppressing the generation of a glass coating at the time of final annealing, rather than removing the generated glass coating.

In the related art, it has been considered that the magnetic characteristics of grain-oriented electrical steel sheets are greatly affected by strain, and the formation of mechanical irregularities causes the deterioration of magnetic characteristics due to strain. Therefore, in a case where the generation of the glass coating is suppressed, the surface state of the steel sheet is a smooth surface. However, the present inventors conceived to dare to apply appropriate mechanical irregularities to the surface of a steel sheet rather than keeping the surface state as a smooth surface in a grain-oriented electrical steel sheet having no glass coating as in the related art. In addition, it is estimated that the magnetic characteristics are improved by the mechanical irregularities, which improve the adhesion of the tension-applying coating and increase the tension applied by the tension-applying insulation coating, and the possibility of such findings was examined.

In recent years, a wet blasting method for processing a surface by spraying a slurry in which particles and a liquid are mixed using compressed air has attracted attention. This technique can use finer abrasives compared to a dry shot blasting method, and is being applied to, for example, control of the surface properties of glass and lenses.

The present inventors have paid attention to the wet blasting method as a method for applying mechanical irregularities to a smooth surface, and have intensively studied the application to a grain-oriented electrical steel sheet having no glass coating.

As described above, in the related art, it has been considered that the magnetic characteristics of grain-oriented electrical steel sheets are greatly affected by strain, and the formation of mechanical irregularities causes the deterioration of the magnetic characteristics due to strain. However, as a result of the study by the present inventors, it has been found that wet blasting causes not only a significant improvement in the adhesion of the tension-applying insulation coating but also a further improvement in the magnetic characteristics of the grain-oriented electrical steel sheet. The reason for this is not clear, but it is estimated that mechanical irregularities that are uniformly formed on a surface with an appropriate size and number density by a wet blasting method cause a reduction in deterioration of magnetic characteristics due to strain and rather develop an anchor effect to improve not only adhesion but also coating tension, consequently leading to an improvement in magnetic characteristics.

In a grain-oriented electrical steel sheet that has no glass coating on the premise of having such mechanical irregularities, it became clear that the influence of the degree of orientation integration of the base steel on magnetic characteristics after forming a tension-applying insulation coating and after a magnetic domain refining treatment is larger than expected. Therefore, the present inventors have found that the control of a temperature rising rate during decarburization annealing and the inclusion of inhibitor strengthening elements in a steel piece are effective for further improving the magnetic characteristics, thereby completing the present invention.

The gist of the present invention completed based on the above findings is as follows.

[1] A grain-oriented electrical steel sheet according to an aspect of the present invention includes: a base steel sheet including, as a chemical composition, by mass %, C: 0.010% or less, Si: 2.50% to 4.00%, Mn: 0.050% to 1.000%, S+Se: 0.005% or less in total, Sol. Al: 0.005% or less, N: 0.005% or less, Bi+Te+Pb: 0% to 0.0300% in total, Sb: 0% to 0.50%, Sn: 0% to 0.50%, Cr: 0% to 0.50%, Cu: 0% to 1.0%, and a remainder of Fe and impurities; and a tension-applying insulation coating provided on a surface of the base steel sheet, in which, on the surface of the base steel sheet, an arithmetic average roughness Ra along a rolling 90° direction that is a direction perpendicular to a rolling direction is 0.60 μm or less, and when a cross section of the base steel sheet is observed along the rolling 90° direction, recessed parts having a depth of 0.1 μm or more and 2.0 μm or less are present on the surface of the base steel sheet in 1.0/100 μm or more and 6.0/100 μm or less.

[2] In the grain-oriented electrical steel sheet according to [1], the base steel sheet may contain, as the chemical composition, Bi+Te+Pb: 0.0005% to 0.0300% in total.

[3] A method for producing a grain-oriented electrical steel sheet according to another aspect of the present invention, includes: a hot rolling step of heating a steel piece and thereafter hot-rolling the steel piece to obtain a hot-rolled steel sheet, the steel piece including, by mass %, C: 0.020% to 0.100%, Si: 2.50% to 4.00%, Mn: 0.050% to 1.000%, S+Se: 0.005% to 0.080% in total, Sol. Al: 0.010% to 0.070%, N: 0.005% to 0.020%, Bi+Te+Pb: 0% to 0.0300% in total, Sb: 0% to 0.50%, Sn: 0% to 0.50%, Cr: 0% to 0.50%, Cu: 0% to 1.0%, and a remainder of Fe and impurities; a hot-rolled sheet annealing step of optionally annealing the hot-rolled steel sheet to obtain a hot-rolled and annealed steel sheet; a cold rolling step of performing one cold rolling or a plurality of cold rollings with intermediate annealing therebetween on the obtained hot-rolled steel sheet or hot-rolled and annealed steel sheet, to obtain a cold-rolled steel sheet; a decarburization annealing step of performing decarburization annealing on the cold-rolled steel sheet to obtain a decarburization-annealed steel sheet; a final annealing step of applying an annealing separator to the decarburization-annealed steel sheet and thereafter performing final annealing; a surface processing step of performing surface processing by wet blasting under conditions satisfying the following Formula (i) on an entire surface of the steel sheet after the final annealing step in a sheet width direction; and an insulation coating forming step of forming a tension-applying insulation coating on the surface of the steel sheet after the surface processing step, in which the annealing separator contains MgO and $Al_2O_3$ as primary components in a mass ratio MgO:$Al_2O_3$ between the MgO and the $Al_2O_3$ in a range of 3:7 to 7:3, and contains 0.5 to 15 mass % of bismuth chloride, $0.15 \leq (S \times c \times p/(6 \times v \times W)) \leq 3.00$      Formula (i)

where, in the Formula (i),

S: a flow rate (L/min) of a slurry used for the wet blasting c: a concentration (vol %) of an abrasive used for the wet blasting ρ: a density (kg/m$^3$) of the abrasive used for the wet blasting v: a relative speed (mm/sec) between a nozzle from which the slurry is discharged and the steel sheet W: a width (mm) of the nozzle from which the slurry is discharged.

[4] In the method for producing a grain-oriented electrical steel sheet according to [3], in the decarburization annealing step, a temperature rising rate S1 in a temperature range of 500° C. or higher and lower than 600° C. and a temperature rising rate S2 in a temperature range of 600° C. or higher and 700° C. or lower may satisfy each of the following Formulas (ii) to (iv).

$$300 \leq S1 \leq 1000 \quad \text{Formula (ii)}$$

$$1000 \leq S2 \leq 3000 \quad \text{Formula (iii)}$$

$$1.0 < S2/S1 \leq 10.0 \quad \text{Formula (iv)}$$

[5] In the method for producing a grain-oriented electrical steel sheet according to [3] or [4], the steel piece may contain, as the chemical composition, Bi+Te+Pb: 0.0005% to 0.0300% in total.

Effects of the Invention

As described above, according to the above aspects of the present invention, it is possible to industrially stably produce a grain-oriented electrical steel sheet which has no glass coating, excellent adhesion of a tension-applying insulation coating, and excellent magnetic characteristics.

EMBODIMENTS OF THE INVENTION

Figure 1A:
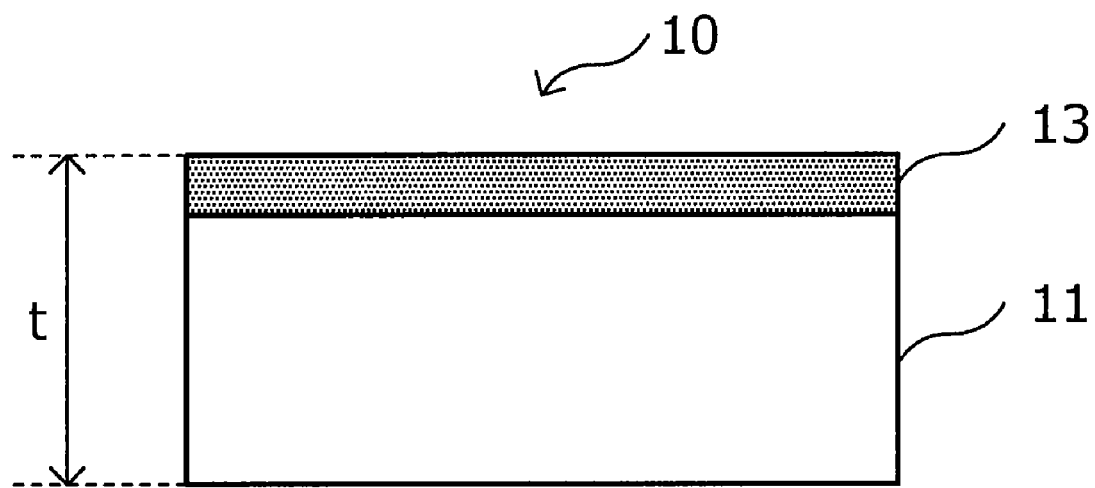
FIG. 1A is a view schematically showing a structure of a grain-oriented electrical steel sheet according to the present embodiment.

Hereinafter, exemplary embodiments of the present invention will be described in detail with reference to the drawings. In the present specification and the drawings, like constituent elements having substantially the same function and configuration are denoted by like reference numerals, and redundant description will be omitted.

(Grain-Oriented Electrical Steel Sheet)

Hereinafter, a grain-oriented electrical steel sheet according to an embodiment of the present invention (the grain-oriented electrical steel sheet according to the present embodiment) will be described in detail.

<Main Configuration of Grain-Oriented Electrical Steel Sheet>

Figure 1B:
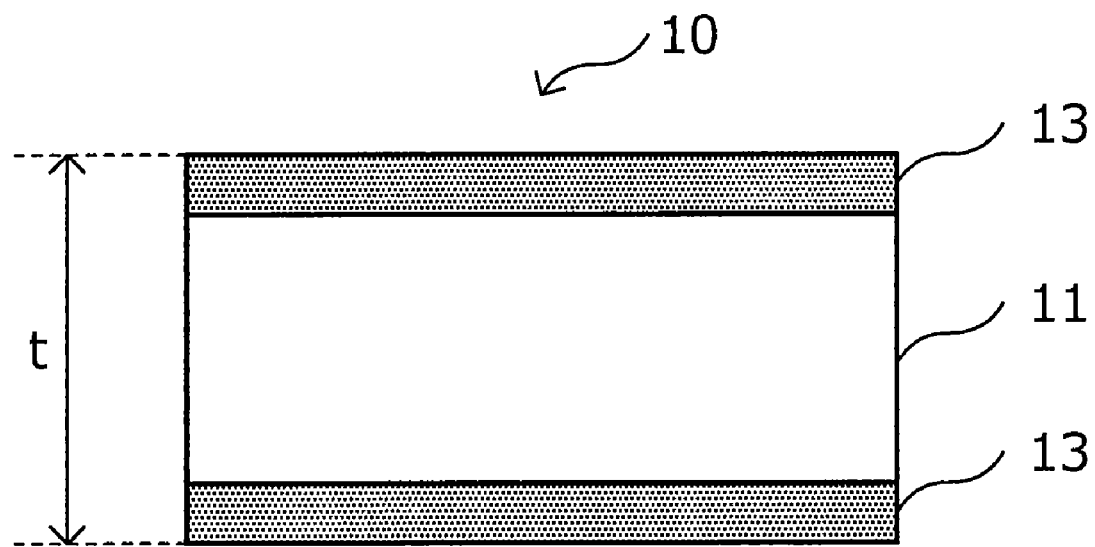
FIG. 1B is a view schematically showing a structure of the grain-oriented electrical steel sheet according to the embodiment.

First, a main configuration of the grain-oriented electrical steel sheet according to the present embodiment will be described with reference to FIGS. 1A and 1B. FIGS. 1A and 1B are views schematically showing the structure of the grain-oriented electrical steel sheet according to the present embodiment.

As schematically shown in FIG. 1A, a grain-oriented electrical steel sheet 10 according to the present embodiment includes a base steel sheet 11, and a tension-applying insulation coating 13 which is an example of an insulation coating formed on the surface of the base steel sheet 11, and no glass coating is present between the base steel sheet 11 and the tension-applying insulation coating 13. In the grain-oriented electrical steel sheet 10 according to the present embodiment, the tension-applying insulation coating 13 may be formed on at least one surface of the base steel sheet 11, but is usually formed on both surfaces of the base steel sheet 11 as schematically shown in FIG. 1B.

Hereinafter, the grain-oriented electrical steel sheet 10 according to the present embodiment will be described focusing on a characteristic configuration. In the following description, detailed descriptions of known configurations and some configurations that can be implemented by those skilled in the art may be omitted.

[Base Steel Sheet 11]

The base steel sheet 11 has a predetermined chemical composition by being produced from a steel piece containing a chemical composition as described in detail below. The surface of the base steel sheet 11 according to the present embodiment is provided with fine recessed parts as described in detail below. Due to the presence of such recessed parts, the grain-oriented electrical steel sheet 10 according to the present embodiment has excellent adhesion of the tension-applying insulation coating 13 and exhibits excellent magnetic characteristics. The chemical composition of the base steel sheet 11 will be described later in detail.

[Tension-Applying Insulation Coating 13]

The tension-applying insulation coating 13 is located on the surface of the base steel sheet 11, and reduces eddy-current loss by applying electrical insulation to the grain-oriented electrical steel sheet 10, thereby improving the iron loss of the grain-oriented electrical steel sheet 10. In addition, the tension-applying insulation coating 13 realizes various characteristics such as corrosion resistance, heat resistance, and slipperiness in addition to the above-described electrical insulation.

Furthermore, the tension-applying insulation coating 13 has a function of applying tension to the grain-oriented electrical steel sheet 10. The iron loss of the grain-oriented electrical steel sheet 10 can be improved by applying tension to the grain-oriented electrical steel sheet 10 to facilitate domain wall movement in the grain-oriented electrical steel sheet 10.

A known magnetic domain refining treatment using a continuous-wave laser beam or an electron beam may be performed on the surface of the tension-applying insulation coating 13.

The tension-applying insulation coating 13 is formed, for example, by applying a coating solution containing a metal phosphate and silica as primary components to the surface of the base steel sheet 11 and baking the resultant.

<Sheet Thickness of Grain-Oriented Electrical Steel Sheet 10>

The product sheet thickness (thickness tin FIGS. 1A and 1B) of the grain-oriented electrical steel sheet 10 according to the present embodiment is not particularly limited, and may be, for example, 0.17 mm or more and 0.35 mm or less. In the present embodiment, the effect becomes remarkable in case of a material having a sheet thickness as small as less than 0.22 mm after cold rolling (that is, a thin material), and the adhesion of the tension-applying insulation coating 13 is further improved. The sheet thickness after cold rolling is, for example, preferably 0.17 mm or more and 0.22 mm or less, and more preferably 0.17 mm or more and 0.20 mm or less.

<Chemical Composition of Base Steel Sheet 11>

Subsequently, the chemical composition of the base steel sheet 11 of the grain-oriented electrical steel sheet 10 according to the present embodiment will be described in detail. Hereinafter, unless otherwise specified, the notation "%" indicates "mass %".

The base steel sheet 11 according to the present embodiment has a chemical composition including, by mass %, C: 0.010% or less, Si: 2.50% to 4.00%, Mn: 0.050% to 1.000%, S+Se: 0.005% or less, Sol. Al: 0.005% or less, and N: 0.005% or less, and optionally including Bi+Te+Pb: 0.03% or less, Sb: 0.50% or less, Sn: 0.50% or less, Cr: 0.50% or less, Cu: 1.0% or less, and the remainder of Fe and impurities.

[C: 0.010% or less]

C (carbon) is an element effective for controlling the structure until the completion of a decarburization annealing step in production steps. However, when the C content exceeds 0.010%, the magnetic characteristics of the grain-oriented electrical steel sheet, which is a product sheet, deteriorate. Therefore, in the base steel sheet 11 of the grain-oriented electrical steel sheet 10 according to the present embodiment, the C content is set to 0.010% or less. The C content is preferably 0.005% or less. The C content is preferably as low as possible. However, even if the C content is reduced to less than 0.0001%, the effect of controlling the structure is saturated and the production cost is increased. Therefore, the C content is preferably 0.0001% or more.

[Si: 2.50% to 4.00%]

Si (silicon) is an element that increases the electric resistance of steel and reduces eddy-current loss. In a case where the Si content is less than 2.50%, the above-described effect of reducing the eddy-current loss cannot be sufficiently obtained. Therefore, the Si content is set to 2.50% or more. The Si content is preferably 2.70% or more, and more preferably 2.80% or more.

On the other hand, when the Si content exceeds 4.00%, the cold workability of steel decreases. Therefore, in the base steel sheet 11 of the grain-oriented electrical steel sheet 10 according to the present embodiment, the Si content is set to 4.00% or less. The Si content is preferably 3.90% or less, and more preferably 3.80% or less.

[Mn: 0.050% to 1.000%]

Mn (manganese) is bonded to S and Se, which will be described later, during the production steps to form MnS and MnSe. These precipitates function as inhibitors (normal grain growth inhibitors) and cause the development of secondary recrystallization in steel. Mn is an element that further enhances the hot workability of steel. In a case where the Mn content is less than 0.050%, the above effects cannot be sufficiently obtained. Therefore, the Mn content is set to 0.050% or more. The Mn content is more preferably 0.060% or more.

On the other hand, when the Mn content exceeds 1.000%, secondary recrystallization is not developed and the magnetic characteristics of the steel deteriorate. Therefore, in the base steel sheet 11 of the grain-oriented electrical steel sheet 10 according to the present embodiment, the Mn content is set to 1.000% or less. The Mn content is more preferably 0.500% or less.

[One or More of S and Se (S+Se): 0.005% or Less in Total]

S (sulfur) and Se (selenium) are bonded to Mn in the production steps to form MnS and MnSe that function as inhibitors. However, in a case where the sum of the S content and the Se content exceeds 0.005%, the magnetic characteristics are deteriorated due to the remaining inhibitors. Therefore, in the base steel sheet 11 according to the present embodiment, the total amount of S and Se is set to 0.005% or less. The total amount of S and Se in the grain-oriented electrical steel sheet is preferably as low as possible. However, even if the total amount of S and Se in the grain-oriented electrical steel sheet is reduced to less than 0.0001%, only the production cost increases. Therefore, the total amount of S and Se in the grain-oriented electrical steel sheet is preferably 0.0001% or more.

[Acid-Soluble Al: 0.005% or Less]

Acid-soluble aluminum (sol. Al) is bonded to N during the production steps of the grain-oriented electrical steel sheet to form AlN that functions as an inhibitor. However, when the amount of acid-soluble Al in the base steel sheet 11 exceeds 0.005%, the inhibitor remains excessively in the base steel sheet 11, so that the magnetic characteristics deteriorate. Therefore, in the base steel sheet 11 according to the present embodiment, the amount of acid-soluble Al is set to 0.005% or less. The amount of acid-soluble Al is preferably 0.004% or less. Although the lower limit of the amount of acid-soluble Al is not particularly specified, even if the amount of acid-soluble Al is reduced to less than 0.0001%, only the production cost increases. Therefore, the amount of acid-soluble Al is preferably 0.0001% or more.

[N: 0.005% or Less]

N (nitrogen) is bonded to Al in the production steps to form AlN that functions as an inhibitor. However, when the N content exceeds 0.005%, the inhibitor excessively remains in the grain-oriented electrical steel sheet, and the magnetic characteristics deteriorate. Therefore, in the base steel sheet 11 according to the present embodiment, the N content is set to 0.005% or less. The N content is preferably 0.004% or less.

On the other hand, although the lower limit of the N content is not particularly specified, even if the lower limit is reduced to less than 0.0001%, only the production cost increases. Therefore, the N content is preferably 0.0001% or more.

[Remainder: Fe and Impurities]

The chemical composition of the base steel sheet 11 according to the present embodiment contains the above-described elements, and the remainder basically consisting of iron (Fe) and impurities. However, for the purpose of enhancing magnetic characteristics, Bi, Te, Pb, Sb, Sn, Cr, and Cu may be further contained in the ranges shown below.

Here, the impurities mean elements that are incorporated from ore as raw materials, scrap, production environments, and the like, when the base steel sheet 11 is industrially produced, and are allowed to be contained in amounts that do not adversely affect the actions of the grain-oriented electrical steel sheet according to the present embodiment.

[At Least One of Bi, Te, or Pb (Bi+Te+Pb): 0% to 0.0300% in Total]

The base steel sheet 11 according to the present embodiment may contain at least one of Bi (bismuth), Te (tellurium), or Pb (lead) as the optional element in place of a part of Fe in the remainder. By including one or more of these elements, the magnetic characteristics of the grain-oriented electrical steel sheet can be further enhanced. In the case of obtaining this effect, the total amount of at least one of Bi, Te, or Pb (one or more selected from Bi, Te, and Pb) is preferably 0.0005% or more, and more preferably 0.0010% or more.

On the other hand, when the total amount of these elements exceeds 0.0300%, hot embrittlement is incurred. Therefore, the total amount of at least one of Bi, Te, or Pb is preferably set to 0.0300% or less. Since Bi, Te, and Pb do not necessarily need to be contained, the lower limit of the total amount thereof is 0%.

The base steel sheet 11 according to the present embodiment may contain, in addition to the above-mentioned optional elements, at least any of Sb (antimony), Sn (tin), Cr (chromium), or Cu (copper), which is effective for improving the magnetic characteristics of the grain-oriented electrical steel sheet, as optional elements. In the case of including these elements, it is preferable that the amounts of the elements are as follows: Sb: 0% or more and 0.50% or less, Sn: 0% or more and 0.50% or less, Cr: 0% or more and 0.50% or less, and Cu: 0% or more and 1.0% or less. The amount of each of the elements is more preferably 0.005% or more, and even more preferably 0.010% or more.

<Surface Shape of Base Steel Sheet 11>

In the base steel sheet 11 according to the present embodiment, the surface serving as the interface with the tension-applying insulation coating 13 has a predetermined arithmetic average roughness Ra, as briefly mentioned earlier, and has recessed parts having a predetermined depth in a predetermined proportion.

Figure 2:
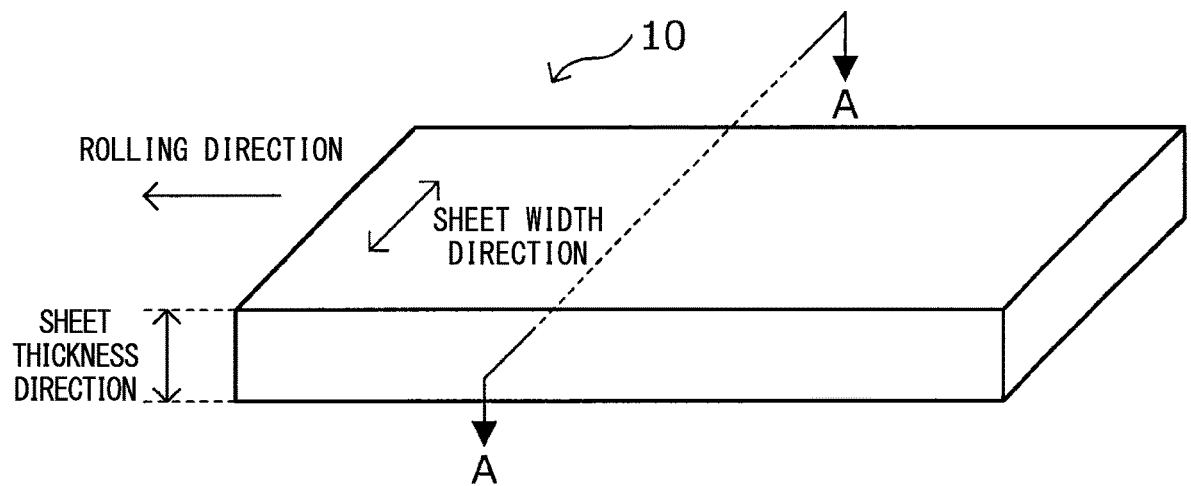
FIG. 2 is a view schematically showing a structure of the grain-oriented electrical steel sheet according to the embodiment.
Figure 3:
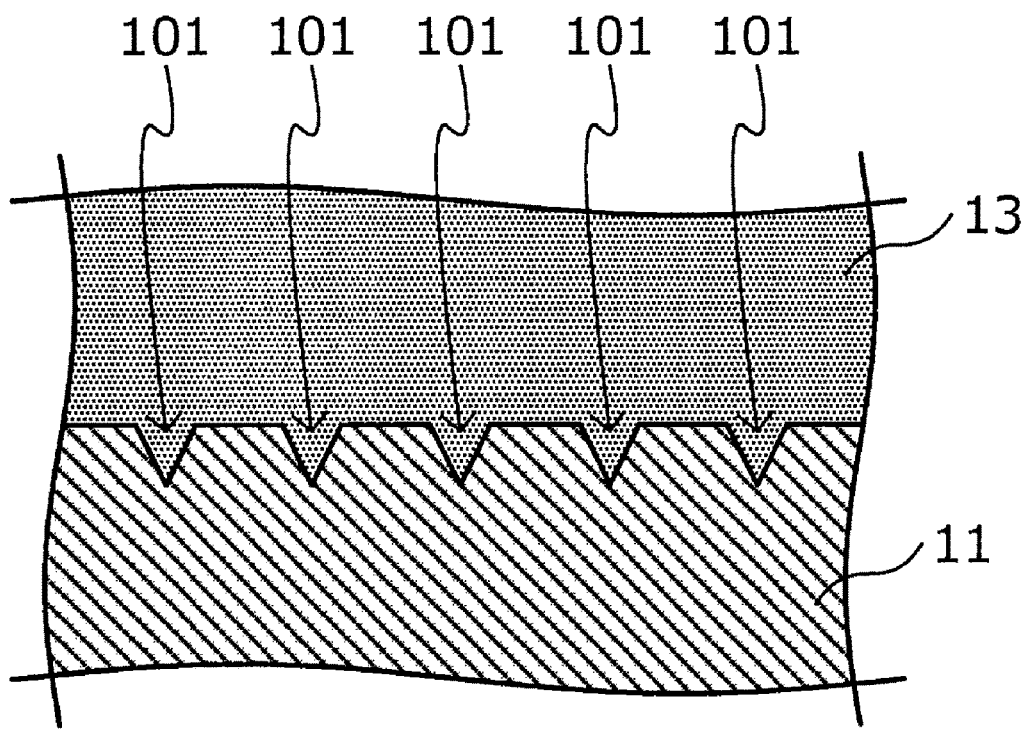
FIG. 3 is a view schematically showing a surface of a base steel sheet of the grain-oriented electrical steel sheet according to the embodiment.
Figure 4:
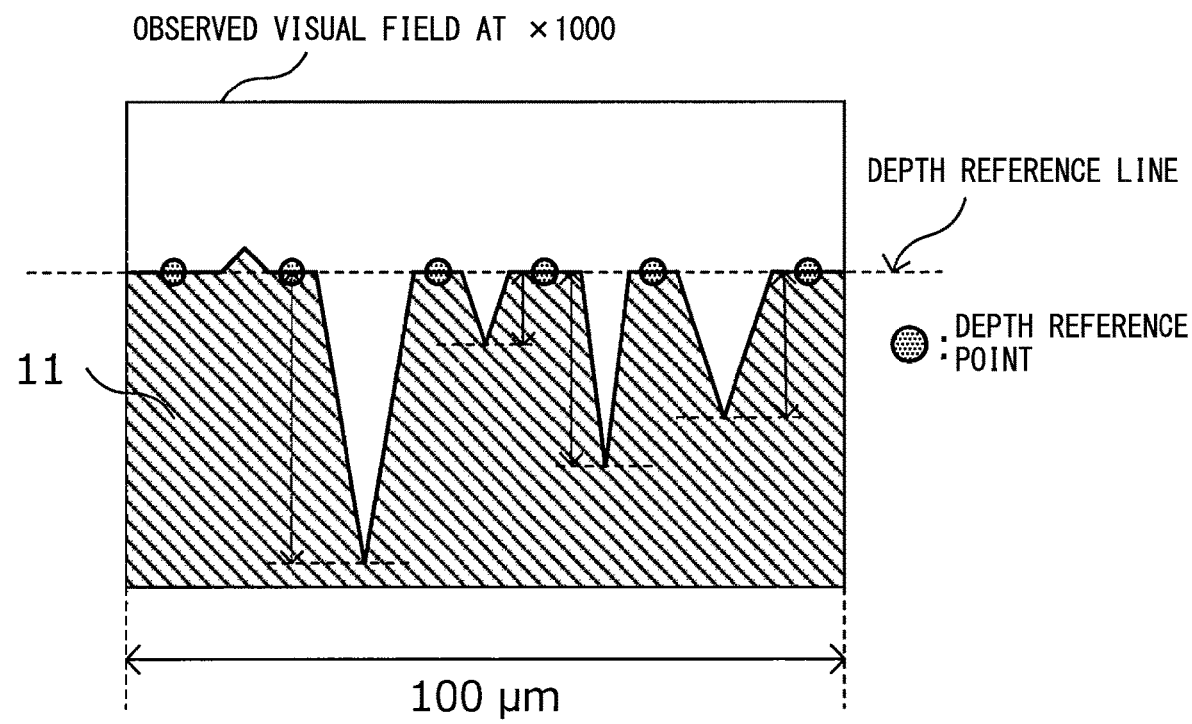
FIG. 4 is a view showing depths of recessed parts on the surface of the base steel sheet according to the embodiment.

Hereinafter, the characteristic surface shape of the base steel sheet 11 according to the present embodiment will be described in detail with reference to FIGS. 2 to 4. FIG. 2 is a view schematically showing the grain-oriented electrical steel sheet according to the present embodiment. FIG. 3 is a view schematically showing the surface of the base steel sheet of the grain-oriented electrical steel sheet according to the present embodiment. FIG. 4 is a view showing the depths of the recessed parts on the surface of the base steel sheet according to the present embodiment.

In a magnetization process of the grain-oriented electrical steel sheet, the domain walls between magnetic domains whose magnetization is oriented in a rolling direction as schematically shown in FIG. 2 mainly move. The movement direction of the domain walls in such a case is a direction perpendicular to the rolling direction (corresponding to a sheet width direction in FIG. 2). Hereinafter, the direction perpendicular to the rolling direction is referred to as "rolling 90° direction". Since the movement direction of the domain walls is the rolling 90° direction, the rolling 90° direction becomes an index of the effect of the surface shape on the magnetic characteristics.

In the grain-oriented electrical steel sheet 10 that exhibits excellent adhesion of the tension-applying insulation coating despite having no glass coating and thus exhibits excellent magnetic characteristics, the surface of the base steel sheet 11 along the rolling 90° direction has a characteristic surface shape.

The surface of the base steel sheet 11 according to the present embodiment has an arithmetic average roughness Ra defined by JIS B 0601 (2013) of 0.60 μm or less in a case where the grain-oriented electrical steel sheet 10 (base steel sheet 11) is cut along A-A cutting-plane line shown in FIG. 2 (that is, parallel to the rolling 90° direction). In a case where the arithmetic average roughness Ra of the surface of the base steel sheet 11 along the rolling 90° direction exceeds 0.60 μm, the movement of the domain walls as described above is affected, and excellent magnetic characteristics cannot be realized. The arithmetic average roughness Ra of the surface of the base steel sheet 11 along the rolling 90° direction is preferably 0.30 μm or more and 0.50 μm or less. The arithmetic average roughness Ra can be measured using a known surface roughness meter based on JIS B 0601 (2013). By immersing the grain-oriented electrical steel sheet after the formation of the tension-applying insulation coating in an aqueous solution having a liquid temperature of 60° C. to 80° C. and a NaOH concentration of 30% to 40%, and measuring the surface after the removal of the tension-applying insulation coating using the known surface roughness meter based on JIS B 0601 (2013), the arithmetic average roughness Ra of the surface of the base steel sheet can be measured.

Regarding the surface of the base steel sheet 11 according to the present embodiment, in the case where the grain-oriented electrical steel sheet 10 (base steel sheet 11) is cut along A-A cutting-plane line shown in FIG. 2, as schematically shown in FIG. 3, recessed parts 101 having a predetermined depth are present on the surface of the base steel sheet 11 in a predetermined proportion. More specifically, on the surface of the base steel sheet 11 in a case of being cut in the rolling 90° direction, recessed parts 101 having a depth of 0.1 μm or more and 2.0 μm or less are present in 1.0/100 μm or more and 6.0/100 μm or less.

That is, on the surface of the base steel sheet 11 according to the present embodiment, the number of the recessed parts 101 present, which have a depth of 0.1 μm or more and 2.0 μm or less, is 1.0 or more and 6.0 or less in a range of a cross-sectional length of 100 μm. In a case where the number of the recessed parts 101 present is less than 1.0/100 μm, the number of the recessed parts 101 formed is too small, and excellent adhesion of the tension-applying insulation coating 13 and excellent magnetic characteristics cannot be realized. On the other hand, in a case where the number of the recessed parts 101 present exceeds 6.0/100 μm, although the adhesion of the tension-applying insulation coating 13 is improved, excellent magnetic characteristics cannot be realized. By causing the number of the recessed parts 101 present to be 1.0/100 μm or more and 6.0/100 μm or less, excellent adhesion of the tension-applying insulation coating 13 is exhibited, and tension applied to the base steel sheet 11 is increased, whereby excellent magnetic characteristics are exhibited. The number of the recessed parts 101 present is preferably 1.0/100 μm or more and 5.0/100 μm or less.

The recessed parts 101 as described above can be observed by using a general scanning electron microscope (SEM) for a cross section in the rolling 90° direction. More specifically, a cross section of the base steel sheet 11 at any position in the rolling 90° direction is observed at a magnification of 1000-fold, and first, a portion where the surface of the base steel sheet 11 is flat is specified. Such a flat portion is used as a "depth reference point" when the depths as shown in FIG. 4 are measured.

In an observed visual field of interest, two or more such depth reference points are selected, a line segment connecting the selected plurality of depth reference points is considered, and the line segment is referred to as a "depth reference line". As schematically shown in FIG. 4, the depth of the recessed part 101 according to the present embodiment is defined as a separation distance between the "depth reference line" specified as described above and the deepest position of the recessed part. Such observation may be performed on any three visual fields at the same magnification (1000-fold), and evaluation may be performed by the average value of the obtained numbers.

The characteristic surface shape of the base steel sheet 11 according to the present embodiment as shown in FIGS. 3 and 4 can be formed by using a wet blasting method, which will be described later. The wet blasting method is realized by projecting a slurry in which an abrasive is mixed onto the surface of the base steel sheet 11. Since the mechanical irregularities formed on the surface of the base steel sheet 11 on which the slurry is projected are uniform, a characteristic flat surface where the above-mentioned flat portions are present is formed.

In the base steel sheet 11 according to the present embodiment, in order to realize the recessed parts 101 having a depth of 2.0 μm or less, a surface processing treatment by wet blasting is performed under specific conditions as described in detail below. Therefore, recessed parts 101 having a depth of more than 2.0 μm are not present on the surface of the base steel sheet 11 according to the present embodiment. In addition, in a case where recessed parts having a depth of more than 2.0 μm are present, the grain-oriented electrical steel sheet does not exhibit excellent magnetic characteristics. Therefore, the presence of recessed parts having a depth of more than 2.0 μm does not need to be considered.

In addition, the recessed parts 101 having a depth of less than 0.1 μm and protrusions having a height of less than 0.1 μm do not affect the improvement in the adhesion of the tension-applying insulation coating 13 and the magnetic characteristics. Therefore, these do not need to be considered during the above-described observation, and the depth of the recessed parts 101 of interest is set to 0.1 μm or more.

The technical meaning is different between the number of recessed parts having a depth of 0.1 μm or more and 2.0 μm or less and the arithmetic average roughness Ra. That is, the number of recessed parts having a depth of 0.1 μm or more and 2.0 μm or less represents mechanical irregularities that contribute to the improvement in the adhesion of the tension-applying insulation coating, and also contributes to the improvement in the magnetic characteristics through the improvement in the coating tension. On the other hand, the arithmetic average roughness Ra represents the average value of the irregular states at the reference length, and does not always coincide with the form of the mechanical irregularities that contribute to the improvement in the adhesion. Even if Ra is high, the number of recessed parts having a depth of 0.1 μm or more and 2.0 μm or less does not always increase.

In addition, as will be described in detail below, the specific surface shape described above is realized only in a case where final annealing is performed using an annealing separator that does not cause the formation of a glass coating and thereafter a surface processing treatment by a wet blasting method performed under appropriate conditions. In a case where final annealing is performed using a general annealing separator that causes the generation of a glass coating and the generated glass coating is removed by chemical polishing or electrolytic polishing, the surface roughness of the base steel sheet 11 cannot be appropriately controlled, the surface becomes too rough, and the recessed parts 101 having the above depth cannot be realized.

Hereinabove, the grain-oriented electrical steel sheet 10 according to the present embodiment has been described in detail.

Various magnetic characteristics of the grain-oriented electrical steel sheet according to the present embodiment can be measured by the Epstein method specified in JIS C 2550-1 (2011) or the single sheet magnetic characteristic measurement method (single sheet tester (SST)) specified in JIS C 2556 (2015).

(Method for Producing Grain-Oriented Electrical Steel Sheet)

Figure 5:
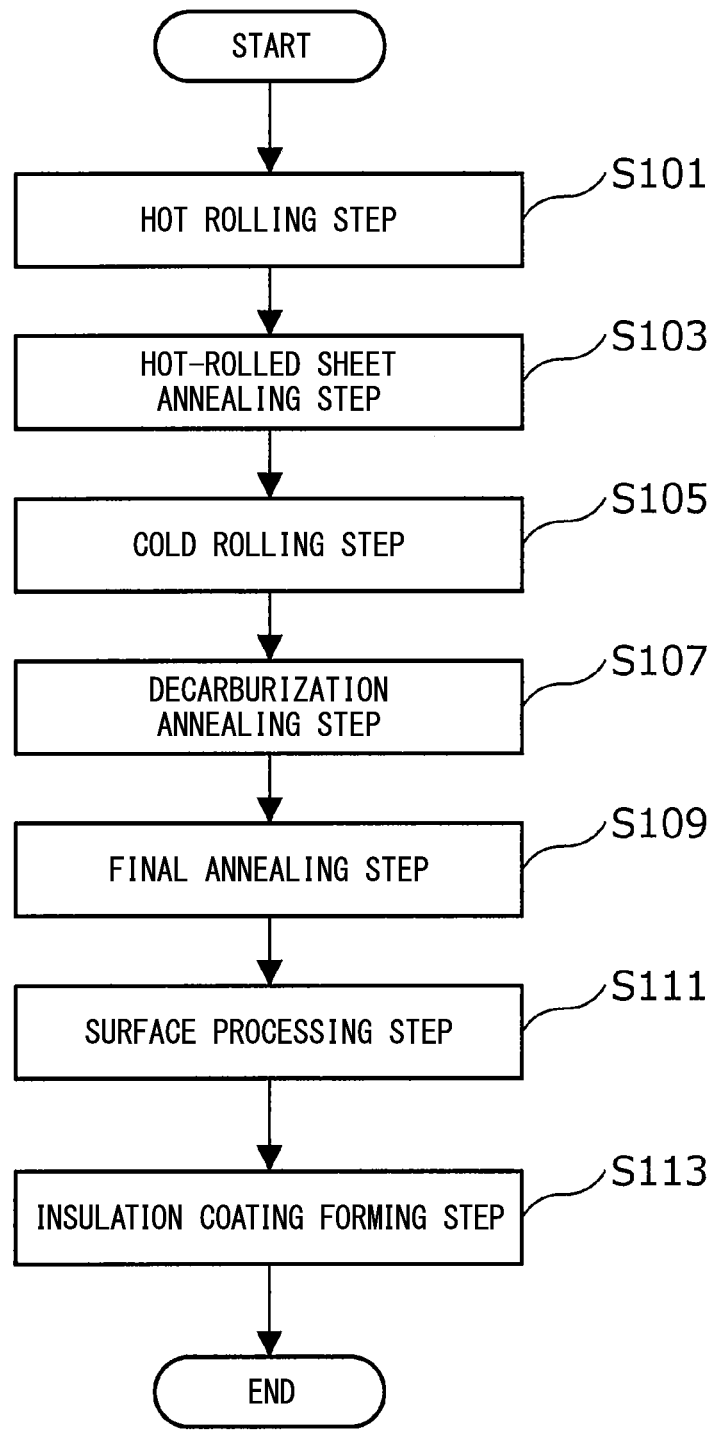
FIG. 5 is a flowchart showing an example of a flow of a method for producing a grain-oriented electrical steel sheet according to the embodiment.

Next, a method for producing a grain-oriented electrical steel sheet according to the present embodiment will be described in detail with reference to FIG. 5. FIG. 5 is a flowchart showing an example of the flow of the method for producing a grain-oriented electrical steel sheet according to the present embodiment.

<Overall Flow of Method for Producing Grain-Oriented Electrical Steel Sheet>

Hereinafter, the overall flow of the method for producing a grain-oriented electrical steel sheet according to the present embodiment will be described.

The overall flow of the method for producing a grain-oriented electrical steel sheet according to the present embodiment is as follows.

First, a steel piece (slab) having a chemical composition described below is hot-rolled to obtain a hot-rolled steel sheet. Thereafter, the hot-rolled steel sheet is annealed to obtain a hot-rolled and annealed steel sheet. Next, the obtained hot-rolled and annealed steel sheet is pickled and then subjected to one or two cold rollings with intermediate annealing therebetween to obtain a cold-rolled steel sheet cold-rolled to a predetermined sheet thickness after cold rolling. Thereafter, the obtained cold-rolled steel sheet is subjected to decarburization and primary recrystallization by annealing in a wet hydrogen atmosphere (decarburization annealing) to obtain a decarburization-annealed steel sheet. In such decarburization annealing, a predetermined oxide film is formed on the surface of the steel sheet. Subsequently, an annealing separator primarily containing MgO and $Al_2O_3$ is applied to the surface of the decarburization-annealed steel sheet and then dried, and final annealing is performed. Such final annealing causes secondary recrystallization, and the grain structure of the steel sheet is integrated in a {110}<001> orientation. In the method for producing a grain-oriented electrical steel sheet according to the present embodiment, since a specific annealing separator that does not cause the generation of a glass coating is used, no glass coating is formed on the surface of the steel sheet after the final annealing, and the surface becomes smooth. Thereafter, a surface processing treatment using wet blasting is performed on the surface of the steel sheet after the final annealing. By this surface processing treatment, recessed parts as described above are formed on the surface of the steel sheet. The final-annealed sheet subjected to the surface processing is washed with water or pickled to remove powder, and then coated with a coating solution primarily containing phosphate and baked to form a tension-applying insulation coating.

That is, as shown in FIG. 5, the method for producing a grain-oriented electrical steel sheet according to the present embodiment includes: a hot rolling step (step S101) of hot-rolling a steel piece having the above chemical composition at a predetermined temperature to obtain a hot-rolled steel sheet; a hot-rolled sheet annealing step (step S103) of optionally annealing the obtained hot-rolled steel sheet to obtain a hot-rolled and annealed steel sheet; a cold rolling step (step S105) of performing one cold rolling or a plurality of cold rollings with intermediate annealing therebetween on the obtained hot-rolled steel sheet or hot-rolled and annealed steel sheet, to obtain a cold-rolled steel sheet; a decarburization annealing step (step S107) of performing decarburization annealing on the obtained cold-rolled steel sheet to obtain a decarburization-annealed steel sheet; a final annealing step (step S109) of applying an annealing separator to the obtained decarburization-annealed steel sheet and thereafter performing final annealing; a surface processing step (step S111) of performing surface processing by wet blasting under predetermined conditions on the entire surface of the steel sheet after the final annealing in a sheet width direction; and an insulation coating forming step (step S113) of forming an insulation coating (more specifically, a tension-applying insulation coating) on the surface of the steel sheet after the surface processing.

Hereinafter, these steps will be described in detail. In the following description, in a case where any condition in each step is not described, each step can be performed by appropriately applying known conditions.

<Hot Rolling Step>

The hot rolling step (step S101) is a step of hot-rolling a steel piece (for example, a steel ingot such as a slab) having a predetermined chemical composition to obtain a hot-rolled steel sheet. In such a hot rolling step, a steel piece of silicon steel having a chemical composition as briefly described below is first heat-treated. Here, the heating temperature is preferably set to be in a range of 1200° C. to 1400° C. The heating temperature is more preferably 1250° C. or higher and 1380° C. or lower. Next, the steel piece heated to the above-described temperature is processed into a hot-rolled steel sheet by subsequent hot rolling. The sheet thickness of the hot-rolled steel sheet is preferably, for example, in a range of 2.0 mm or more and 3.0 mm or less.

<Chemical Composition of Steel Piece>

The chemical composition of the steel piece subjected to the hot rolling step will be briefly described below. In the following description, unless otherwise specified, the notation "%" indicates "mass %".

[C: 0.020% to 0.100%]

C is an element effective for improving magnetic characteristics through control of the structure until the completion of the decarburization annealing step in the production steps. In a case where the C content in the steel piece is less than 0.020%, or in a case where the C content in the steel piece exceeds 0.100%, the above-described effect of improving magnetic characteristics cannot be obtained. Therefore, the C content in the steel piece is 0.020% to 0.100%. The C content in the steel piece is preferably 0.030% to 0.090%.

[Si: 2.50% to 4.00%]

Si is an element that increases the electrical resistance of steel and reduces eddy-current loss. In a case where the Si content in the steel piece is less than 2.50%, the effect of reducing the eddy-current loss cannot be sufficiently obtained. Therefore, the Si content is set to 2.50% or more. The Si content in the steel piece is preferably 2.70% or more, and more preferably 2.80% or more.

On the other hand, in a case where the Si content in the steel piece exceeds 4.00%, the cold workability of steel decreases. Therefore, the Si content in the steel piece is set to 4.00% or less. The Si content in the steel piece is preferably 3.90% or less, and more preferably 3.80% or less.

[Mn: 0.050% to 1.000%]

Mn is bonded to S and Se during the production steps to form MnS and MnSe. These precipitates function as inhibitors and cause the development of secondary recrystallization in steel. Mn is also an element that enhances the hot workability of steel. In a case where the Mn content in the steel piece is less than 0.050%, these effects cannot be sufficiently obtained. Therefore, in the steel piece, the Mn content is set to 0.050% or more. The Mn content is more preferably 0.060% or more.

On the other hand, in a case where the Mn content in the steel piece exceeds 1.000%, secondary recrystallization is not developed and the magnetic characteristics of the steel deteriorate. Therefore, in the steel piece, the Mn content is set to 0.050 to 1.000%. The Mn content is more preferably 0.500% or less.

[One or More of S and Se (S+Se): 0.005% to 0.080% in Total]

S and Se are bonded to Mn in the production steps to form MnS and MnSe that function as inhibitors. In a case where the total amount of S and Se is less than 0.005%, it is difficult to exert the effect of forming MnS and MnSe. Therefore, the total amount of S and Se in the steel piece is set to 0.005% or more. The total amount of S and Se in the steel piece is preferably 0.006% or more.

On the other hand, in a case where the total amount of S and Se exceeds 0.080%, not only do the magnetic characteristics deteriorate, but also hot embrittlement is incurred. Therefore, the total amount of S and Se in the steel piece is set to 0.080% or less. The total amount of S and Se is preferably 0.070% or less.

[Acid-Soluble Al: 0.010% to 0.070%]

Acid-soluble Al (sol. Al) is bonded to N during the production steps of the grain-oriented electrical steel sheet to form AlN that functions as an inhibitor. In a case where the amount of acid-soluble Al is less than 0.010%, AlN is not sufficiently generated, and magnetic characteristics deteriorate. In a case where the amount of acid-soluble Al exceeds 0.070%, not only do the magnetic characteristics deteriorate, but also acid-soluble Al causes cracking during cold rolling. Therefore, the amount of acid-soluble Al in the steel piece is set to 0.010% to 0.070%. The amount of acid-soluble Al is preferably 0.020% to 0.050%.

[N: 0.005% to 0.020%]

N is bonded to Al in the production steps to form AlN that functions as an inhibitor. In a case where the N content is less than 0.005%, AlN is not sufficiently generated, and the magnetic characteristics deteriorate. Therefore, in the steel piece, the N content is set to 0.005% or more.

On the other hand, in a case where the N content exceeds 0.020%, it becomes difficult for AlN to function as an inhibitor, and there may be cases where secondary recrystallization is not developed. Moreover, AlN causes cracking during cold rolling. Therefore, in the steel piece, the N content is set to 0.020% or less. The N content is preferably 0.012% or less, and more preferably 0.010% or less.

[Remainder: Fe and Impurities]

The chemical composition of the steel piece basically contains the above-mentioned elements and the remainder consisting of Fe and impurities. However, for the purpose of enhancing magnetic characteristics, Bi, Te, Pb, Sb, Sn, Cr, and Cu may be further contained in the ranges shown below. Since these elements do not necessarily need to be contained, the lower limit thereof is 0%.

Here, the impurities mean elements that are incorporated from ore as raw materials, scrap, production environments, and the like, when the steel piece (for example, steel slab) is industrially produced, and are allowed to be contained in ranges that do not adversely affect the actions of the grain-oriented electrical steel sheet according to the present embodiment.

[At Least One of Bi, Te, and Pb (Bi+Te+Pb): 0% to 0.0300% in Total]

The steel piece may contain, as an optional element, at least one of Bi, Te, or Pb in pace of a part of Fe in the remainder, in a total amount of 0.0300% or less. By including at least one of these elements, the magnetic characteristics of the grain-oriented electrical steel sheet can be further improved. The total amount of at least one of Bi, Te, or Pb is preferably 0.0005% or more, and more preferably 0.0010% or more.

However, in a case where the total amount of these elements exceeds 0.0300%, these elements cause hot embrittlement. Therefore, the total amount of at least one of Bi, Te, or Pb in the steel piece is preferably 0% to 0.0300%.

In addition, the steel piece may further contain at least any of Sb, Sn, Cr, or Cu, which is effective for improving the magnetic characteristics of the grain-oriented electrical steel sheet. In the case of including these elements, it is preferable that the amounts of the elements are as follows: Sb: 0% or more and 0.50% or less, Sn: 0% or more and 0.50% or less, Cr: 0% or more and 0.50% or less, and Cu: 0% or more and 1.0% or less. The amount of each of the elements is more preferably 0.005% or more, and even more preferably 0.010% or more.

<Hot-Rolled Sheet Annealing Step>

The hot-rolled sheet annealing step (step S103) is a step of annealing the hot-rolled steel sheet produced through the hot rolling step to obtain a hot-rolled and annealed steel sheet. By performing such an annealing treatment, recrystallization occurs in the structure of the steel sheet, and it is possible to realize good magnetic characteristics.

In the hot-rolled sheet annealing step according to the present embodiment, the hot-rolled steel sheet produced through the hot rolling step may be annealed to obtain the hot-rolled and annealed steel sheet according to a known method. Means for heating the hot-rolled steel sheet during the annealing is not particularly limited, and a known heating method can be adopted. The annealing conditions are not particularly limited. For example, the hot-rolled steel sheet can be annealed in a temperature range of 900° C. to 1200° C. for 10 seconds to 5 minutes.

Such a hot-rolled sheet annealing step can be omitted as necessary.

In addition, after the hot-rolled sheet annealing step and before the cold rolling step described in detail below, the surface of the hot-rolled steel sheet may be subjected to pickling.

<Cold Rolling Step>

The cold rolling step (step S105) is a step of performing one or two or more cold rollings with intermediate annealing therebetween on the hot-rolled steel sheet after the hot rolling step or the hot-rolled and annealed steel sheet after the hot-rolled sheet annealing to obtain a cold-rolled steel sheet. In addition, in a case where the hot-rolled sheet annealing as described above is performed, the shape of the steel sheet is improved, so that a possibility of fracture of the steel sheet in the first rolling can be reduced. The cold rolling may be performed by dividing into three or more times, but is preferably performed once or twice so as not to increase the production cost.

In the cold rolling step according to the present embodiment, the hot-rolled steel sheet or the hot-rolled and annealed steel sheet may be cold-rolled to obtain a cold-rolled steel sheet according to a known method. For example, the final rolling reduction can be in a range of 80% or more and 95% or less. In a case where the final rolling reduction is less than 80%, the possibility that a Goss nucleus having a {110}<001> orientation with a high degree of integration in the rolling direction cannot be obtained increases, which is not preferable. On the other hand, in a case where the final rolling reduction exceeds 95%, the possibility of secondary recrystallization becoming unstable in the subsequent final annealing step increases, which is not preferable. By causing the final rolling reduction to be within the above range, a Goss nucleus having a {110}<001> orientation with a high degree of integration in the rolling direction can be obtained, and the instability of secondary recrystallization can be suppressed.

The final rolling reduction is the cumulative rolling reduction of the cold rolling, and is the cumulative rolling reduction of cold rolling after intermediate annealing in a case where intermediate annealing is performed.

In a case where two or more cold rollings with intermediate annealing therebetween are performed, it is preferable that the first cold rolling is performed at a rolling reduction of about 5% to 50% and the intermediate annealing is performed at a temperature of 950° C. to 1200° C. for about 30 seconds to 30 minutes.

Here, the sheet thickness of the cold-rolled steel sheet subjected to the cold rolling (the sheet thickness after cold rolling) is usually different from the sheet thickness of a grain-oriented electrical steel sheet finally produced (product sheet thickness including the thickness of the tension-applying insulation coating). The product sheet thickness of the grain-oriented electrical steel sheet is as described above.

In the cold rolling step as described above, an aging treatment can be given to further improve the magnetic characteristics. In a case where the cold rolling is performed by a plurality of passes, it is preferable that a heat effect of holding the steel sheet in a temperature range of 100° C. or higher for a time of 1 minute or longer is given in any intermediate stage before the final pass. Due to such a heat effect, it is possible to form a better primary recrystallization texture in the subsequent decarburization annealing step, and furthermore, it is possible to sufficiently develop a good secondary recrystallization structure with the {110}<001> orientation aligned with the rolling direction in the subsequent final annealing step.

<Decarburization Annealing Step>

The decarburization annealing step (step S107) is a step of performing decarburization annealing on the obtained cold-rolled steel sheet to obtain a decarburization-annealed steel sheet. In the method for producing a grain-oriented electrical steel sheet according to the present embodiment, in the decarburization annealing step, the secondary recrystallization grain structure is controlled by performing an annealing treatment in accordance with predetermined heat treatment conditions.

The decarburization annealing step according to the present embodiment includes two steps, which are a temperature raising step and a soaking step, in order to obtain a desired secondary recrystallization grain structure.

In the temperature raising step in the decarburization annealing step, the temperature rising rate until a temperature is reached to a decarburization annealing temperature affects the degree of integration of the Goss orientation after the secondary recrystallization through a change in the primary recrystallization texture. In a grain-oriented electrical steel sheet that has no glass coating on the premise of having the recessed parts 101 as described above, the influence of the degree of Goss orientation integration of the base steel on magnetic characteristics after forming a tension-applying insulation coating and after a magnetic domain refining treatment is large, and it is preferable to appropriately control the temperature rising rate during the decarburization annealing.

From the viewpoint of improving the primary recrystallization texture, the temperature rising rate in a temperature range of 500° C. to 700° C. is suitably 300° C./sec or more. Here, a temperature rising rate S1 in a temperature raising process at 500° C. or higher and lower than 600° C. and a temperature rising rate S2 in a temperature raising process at 600° C. or higher and 700° C. or lower have different suitable ranges from the viewpoint of an influence on the primary recrystallization texture and an influence on the oxide film formed during the decarburization annealing. The temperature range of 500° C. or higher and lower than 600° C. has an influence on not only the primary recrystallization texture but also the formation of a Mn-based oxide. The temperature range of 600° C. or higher and 700° C. or lower has an influence on not only the primary recrystallization texture but also the formation of Sift.

In the present embodiment in which the formation of a glass coating is suppressed by using an annealing separator described below, the retention time at the temperature range of 600° C. or higher and 700° C. or lower in which $SiO_2$ that affects the formation reaction of the glass coating is formed is preferably short. Therefore, the temperature rising rate S2 in the temperature raising process at 600° C. or higher and 700° C. or lower is set to 1000° C./sec or more and 3000° C./sec or less, and is preferably higher than the temperature rising rate S1 in the temperature raising process at 500° C. or higher and lower than 600° C. As described above, from the viewpoint of improving the primary recrystallization texture and obtaining a grain-oriented electrical steel sheet having no glass coating, the temperature rising rates S1 and S2 satisfy the relationships represented by Formulas (101) to (103). By satisfying the relations represented by Formulas (101) to (103), the magnetic characteristics (iron loss) of the grain-oriented electrical steel sheet can be further improved.

$$300 \leq S1 \leq 1000 \quad \text{Formula (101)}$$

$$1000 \leq S2 \leq 3000 \quad \text{Formula (102)}$$

$$1.0 < S2/S1 \leq 10.0 \quad \text{Formula (103)}$$

Regarding Formula (101), in a case where the temperature rising rate S1 is less than 300° C./sec, there is a possibility that the magnetic characteristics may be deteriorated due to a change in the primary recrystallization texture, which is not preferable. On the other hand, in a case where the temperature rising rate S1 exceeds 1000° C./sec, there is a possibility that the adhesion between the base steel sheet 11 and the tension-applying insulation coating 13 may not be sufficient, which is not preferable. The temperature rising rate S1 in the temperature range of 500° C. or higher and lower than 600° C. is more preferably 350° C./sec or more and 900° C./sec or less.

Regarding Formula (102), in a case where the temperature rising rate S2 is less than 1000° C./sec, there is a possibility that the formation of $SiO_2$ that affects the glass coating formation reaction may not be sufficiently suppressed, which is not preferable. On the other hand, in a case where the temperature rising rate S2 exceeds 3000° C./sec, there is a possibility of overshoot of the decarburization annealing temperature, which is not preferable. The temperature rising rate S2 in the temperature range of 600° C. or higher and 700° C. or lower is more preferably 1200° C./sec or more and 2500° C./sec or less.

Regarding Formula (103), in a case where the ratio S2/S1 between the temperature rising rates is 1.0 or less, there is a possibility that the magnetic characteristics may deteriorate, which is not preferable. On the other hand, in a case where the ratio S2/S1 between the temperature rising rates exceeds 10.0, there is a possibility that temperature control may become difficult, which is not preferable. The ratio S2/S1 between the temperature rising rates is more preferably 1.2 or more and 9.0 or less.

It is preferable to heat the cold-rolled steel sheet to a decarburization annealing temperature of 750° C. or higher and 950° C. or lower under the above-described temperature rising rate.

The other conditions (for example, the temperature raising atmosphere) in the temperature raising step are not particularly limited, and the temperature of the cold-rolled steel sheet may be raised in a known wet atmosphere containing hydrogen and nitrogen according to a normal method.

After the temperature raising step described above, the soaking step of holding the decarburization annealing temperature is performed. The soaking step is not particularly limited as long as the above-mentioned conditions in the temperature raising step are satisfied. For example, the soaking step may be a step of holding a temperature in a range of 750° C. or higher and 950° C. or lower for 1 minute or longer and 5 minutes or shorter. Also, the soaking atmosphere is not particularly limited, and the soaking step may be performed in a known wet atmosphere containing hydrogen and nitrogen according to a normal method.

<Final Annealing Step>

The final annealing step (step S109) is a step of applying a predetermined annealing separator to the decarburization-annealed steel sheet obtained in the decarburization annealing and thereafter performing final annealing. Here, the final annealing is generally performed for a long period of time in a state where the steel sheet is coiled in a coil shape. Therefore, prior to the final annealing, the annealing separator is applied to the decarburization-annealed steel sheet and dried for the purpose of preventing seizure between inside and outside of the coiled steel sheet. In the method for producing a grain-oriented electrical steel sheet according to the present embodiment, an annealing separator that does not form a glass coating is used.

As the annealing separator that does not form a glass coating as described above, an annealing separator containing MgO and $Al_2O_3$ as primary components (for example, containing 85% or more of MgO and $Al_2O_3$ in total) in a mass ratio (MgO:$Al_2O_3$) in a range of 3:7 to 7:3, and containing 0.5 to 15 mass % of bismuth chloride is used. By using the annealing separator having such a mass ratio and bismuth chloride content, a base steel sheet having no glass coating and being excellent in smoothness can be obtained.

In a case where the ratio of MgO exceeds the above range, a glass coating is formed on the surface of the steel sheet and remains, so that a base steel sheet having good smoothness cannot be obtained. In a case where the ratio of $Al_2O_3$ is larger than the above range, seizure of $Al_2O_3$ occurs, so that a base steel sheet having good smoothness cannot be obtained. The mass ratio between MgO and $Al_2O_3$ (MgO:$Al_2O_3$) is preferably in a range of 3.5:6.5 to 6.5:3.5.

Furthermore, since bismuth chloride has an effect of facilitating peeling of the formed glass coating, in a case where the bismuth chloride content is less than 0.5 mass %, the glass coating remains. On the other hand, in a case where the bismuth chloride content exceeds 15 mass %, the function of preventing seizure between steel sheets as an annealing separator is impaired. The bismuth chloride content is preferably 3 to 7 mass %.

Here, examples of the bismuth chloride include bismuth oxychloride (BiOCl) and bismuth trichloride (BiCl$_3$), but a kind of compound capable of forming bismuth oxychloride from the reaction in the annealing separator during the final annealing step may be used. Examples of the kind of compound capable of forming bismuth oxychloride include a mixture of a bismuth compound and a chlorine compound of a metal. Examples of the bismuth compound include bismuth oxide, bismuth hydroxide, bismuth sulfide, bismuth sulfate, bismuth phosphate, bismuth carbonate, bismuth nitrate, bismuth organic acid, and bismuth halide, and examples of the chlorine compound of a metal include iron chloride, cobalt chloride, and nickel chloride.

The above-mentioned annealing separator is applied to the surface of the steel sheet after decarburization annealing and dried, and then the steel sheet is subjected to final annealing. The heat treatment conditions in the final annealing step according to the present embodiment are not particularly limited, and for example, holding is performed in a temperature range of 1100° C. or higher and 1300° C. or lower for 10 hours or longer and 30 hours or shorter. The atmosphere in a furnace may be a known nitrogen atmosphere or a nitrogen-hydrogen atmosphere. After the final annealing, it is preferable to remove the excess annealing separating agent on the surface of the steel sheet by washing with water or pickling.

<Surface Processing Step>

The surface processing step (step S111) is a step of performing surface processing by wet blasting on the entire surface of the steel sheet after the final annealing in a sheet width direction under conditions satisfying Formula (104). As a result, recessed parts 101 having a characteristic distribution as described above are formed on the surface of the steel sheet after the final annealing.

$$0.15 \leq (S \times c \times \rho/(6 \times v \times W)) \leq 3.00 \quad \text{Formula (104)}$$

Here, in Formula (104),

S: Flow rate (L/min) of a slurry used for wet blasting c: Concentration (vol %) of an abrasive used for wet blasting $\rho$: Density (kg/m$^3$) of the abrasive used for wet blasting v: Relative speed (mm/sec) between a nozzle from which the slurry is discharged and the steel sheet W: Width (mm) of the nozzle from which the slurry is discharged (width of a slurry projection opening).

More specifically, after preparing a known wet blasting device capable of satisfying the conditions of Formula (104), the wet blasting device may be installed on a surface processing line in accordance with a normal wet blasting method, and a wet blasting treatment may be performed on the steel sheet after the final annealing. Here, the installation conditions and the like of the wet blasting device are not particularly limited, and the number of nozzles from which the slurry is discharged may be one or more.

The value represented by the central term in Formula (104) corresponds to the amount of the abrasive that is projected per unit area. In a case where the value represented by the central term exceeds 3.00, excessive recessed parts 101 are formed on the surface of the steel sheet (the number of recessed parts 101 present, which have a depth of 0.1 μm or more and 2.0 μm or less, exceeds 6.0/100 μm), and the magnetic characteristics of the grain-oriented electrical steel sheet deteriorate. In addition, the arithmetic average roughness Ra exceeds 0.60 μm, and the magnetic characteristics deteriorate. On the other hand, in a case where the value represented by the center term is less than 0.15, the adhesion of the tension-applying insulation coating and the effect of reducing iron loss by the application of the tension become insufficient.

Regarding the variable v in Formula (104), in the case of a form in which the slurry is projected onto the stopped steel sheet while the nozzles are moved, the variable v corresponds to the movement speed of the nozzles. In the case of a form in which the slurry is projected from a fixed nozzle onto a steel sheet conveyed on a continuous line, the variable v corresponds to the line speed.

The solvent contained in the slurry is not particularly limited, but for example, water can be used from the viewpoint of cost. In addition, in order to obtain the adhesion of the tension-applying insulation coating and the effect of reducing iron loss by forming the desired recessed parts 101, the kind of the abrasive used for wet blasting is not particularly limited, but from the viewpoint of cost and obtained effects, it is preferable to use, for example, alumina having a center particle size of 40 to 60 μm.

<Insulation Coating Forming Step>

The insulation coating forming step (step S113) is a step of forming a tension-applying insulation coating on one surface or both surfaces of the cold-rolled steel sheet after the surface processing. Here, the insulation coating forming step is not particularly limited, and the application and drying of a treatment liquid may be performed by a known method using a known insulation coating treatment liquid as described below. By forming the tension-applying insulation coating on the surface of the steel sheet, it is possible to further improve the magnetic characteristics of the grain-oriented electrical steel sheet.

The surface of the steel sheet on which the insulation coating is formed may be a surface subjected to any pretreatment such as degreasing with an alkali or the like, or pickling with hydrochloric acid, sulfuric acid, phosphoric acid, or the like before applying the treatment liquid, or may be the surface as it is after the final annealing without being subjected to these pretreatments.

Here, the insulation coating formed on the surface of the steel sheet is not particularly limited as long as it is used as the insulation coating of the grain-oriented electrical steel sheet, and a known insulation coating can be used. Examples of such an insulation coating include a composite insulation coating that primarily contains an inorganic substance and further contains an organic substance. Here, the composite insulation coating is, for example, an insulation coating primarily containing at least any of inorganic substances such as a metal chromate, a metal phosphate, colloidal silica, a Zr compound, and a Ti compound, and containing fine organic resin particles dispersed therein. In particular, from the viewpoint of reducing an environmental load during production, which has been increasingly required in recent years, an insulation coating using a metal phosphate, a coupling agent of Zr or Ti, or a carbonate or an ammonium salt thereof as a starting material is preferably used.

Furthermore, subsequently to the above-described insulation coating forming step, flattening annealing for shape straightening may be performed. By performing flattening annealing on the steel sheet, it is possible to further reduce iron loss.

In the method for producing a grain-oriented electrical steel sheet according to the present embodiment, the magnetic domain refining treatment may be performed after the final annealing step or the insulation coating forming step. The magnetic domain refining treatment is a treatment of irradiating the surface of the grain-oriented electrical steel sheet with laser light having a magnetic domain refining effect or forming grooves on the surface. By such a magnetic domain refining treatment, a grain-oriented electrical steel sheet having more excellent magnetic characteristics can be produced.

Through the steps described above, the grain-oriented electrical steel sheet according to the present embodiment can be produced.

Hereinabove, the method for producing a grain-oriented electrical steel sheet according to the present embodiment has been described in detail.

EXAMPLES

Hereinafter, the technical contents of the present invention will be further described with reference to examples and comparative examples. The conditions of the following examples are condition examples adopted to confirm the feasibility and effects of the present invention, and the present invention is not limited to these condition examples. Furthermore, the present invention may adopt various conditions as long as the object of the present invention is achieved without departing from the gist of the present invention.

Experimental Example 1

A steel slab A containing C: 0.082 mass %, Si: 3.30 mass %, Mn: 0.082 mass %, S: 0.023 mass %, acid-soluble Al: 0.025 mass %, N: 0.008 mass %, and the remainder consisting of Fe and impurities, and a steel slab B containing C: 0.081 mass %, Si: 3.30 mass %, Mn: 0.083 mass %, S: 0.022 mass %, acid-soluble Al: 0.025 mass %, N: 0.008 mass %, Bi: 0.0025 mass %, and the remainder consisting of Fe and impurities were each heated to 1350° C. and hot rolled to obtain hot-rolled steel sheets having a thickness of 2.3 mm. Each of the obtained hot-rolled steel sheets was annealed at 1100° C. for 120 seconds, and then pickled. The hot-rolled steel sheets after the pickling were finished to 0.23 mm by cold rolling to obtain cold-rolled steel sheets. Thereafter, decarburization annealing was performed on the obtained cold-rolled steel sheets. In such decarburization annealing, each of the cold-rolled steel sheets was heated with a temperature rising rate S1 of 400° C./sec in a temperature raising process at 500° C. or higher and lower than 600° C., and a temperature rising rate S2 of 1100° C./sec (S2/S1=2.75) in a temperature raising process at 600° C. or higher and 700° C. or lower and held at 850° C. for 120 seconds. Thereafter, an annealing separator having a composition having a mixing ratio between MgO and $Al_2O_3$ of 50%:50% (mass ratio 1:1) by mass % and containing 5 mass % of BiOCl was applied and dried, and then the steel sheet was subjected to final annealing at 1200° C. for 20 hours.

When the excess annealing separator of each of the obtained steel sheets was removed by washing with water, no glass coating was formed on any of the steel sheets. Furthermore, when chemical analysis was performed after removing the excess annealing separator by washing with water, any of the steel sheets had a C content of 0.001% or less, a sol. Al content of 0.005% or less, a S content of 0.005% or less, and a N content of 0.005% or less. Furthermore, the Si content was 3.30%, the Mn content was 0.050% to 0.083%, and the Bi content was 0% to 0.0025%.

A test piece was cut out from the steel sheet from which the excess annealing separator was removed by washing with water, and subjected to stress relieving annealing. Thereafter, alumina abrasive particles having a center particle size of 50 μm using water as a solvent were formed into a slurry, and the slurry was projected onto both surfaces of the steel sheet by wet blasting while fixing the conditions of a nozzle movement speed v of 200 mm/sec and a nozzle width w of 250 mm and changing the flow rate of the slurry and the abrasive concentration. In Test Nos. 1-10 to 1-13, 1-22 to 1-25, 1-28, and 1-29 shown below, the slurry projection amount was changed by performing projection multiple times. In Test Nos. 1-26 and 1-27, wet blasting was not performed, and the surface properties were smooth surfaces.

Thereafter, an aqueous solution containing aluminum phosphate and colloidal silica as primary components was applied to each test piece, and baked at 850° C. for 1 minute, whereby a tension-applying insulation coating having a coating amount of 4.5 g/m² was formed on the surface of the test piece. The obtained test piece was irradiated with a laser beam to perform a magnetic domain refining treatment.

<Evaluation>

Each of the obtained test pieces was evaluated from the viewpoint of magnetic characteristics, the surface shape of the base steel sheet, and the adhesion of the tension-applying insulation coating. The evaluation methods are as follows.

[Magnetic Characteristics]

Using a method for measuring magnetic characteristics using a single sheet tester specified in JIS C 2556 (2015), a magnetic flux density B8 in a rolling direction (magnetic flux density at 800 A/m) and an iron loss W17/50 (iron loss when magnetized to 1.7 T at 50 Hz) were each evaluated.

[Surface Shape of Base Steel Sheet]

For the recessed parts formed on the surface of the base steel sheet by the wet blasting, the arithmetic average roughness Ra in a rolling 90° direction after the wet blasting was measured using a surface roughness meter (SURFCORDER manufactured by Kosaka Laboratory Ltd.). In addition, the cross section of the steel sheet after the wet blasting in the rolling 90° direction was observed with a scanning electron microscope (JSM-IT300), and the number of recessed parts having a depth of 0.1 μm or more and 2.0 μm or less was evaluated. As described above, observation was performed in three visual fields at a magnification of 1000-fold, and an average value was calculated from the obtained measurement results.

[Adhesion of Tension-Applying Insulation Coating]

The adhesion of the tension-applying insulation coating was evaluated using a test piece taken with the rolling direction as a longitudinal direction by a bending test at a bending diameter of φ10 and a bending diameter of φ20 with a cylindrical mandrel bending tester. For the evaluation, the ratio of the area of the tension-applying insulation coating remaining without peeling to the area of the bent portion on the surface of the test piece after the bending test (residual coating ratio) was calculated, and determination was made based on the residual coating ratio. The criteria were as follows, and the grades A and B were regarded as pass.

Grade A: Residual coating ratio of 90% or more

B: Residual coating ratio of 70% or more and less than 90%

C: Residual coating ratio of less than 70%

The obtained results are summarized in Table 1 below.

TABLE 1

| | | Wet blasting conditions | | | Surface shape | | | | Adhesion | | |
|---|---|---|---|---|---|---|---|---|---|---|---|
| | | Slurry flow | Abrasive concen- | $(S \times c \times p)/(6 \times v \times W)$ | Ra | Number of recessed parts | Magnetic flux density B8 | Iron loss W17/50 | φ20 | φ10 | |
| Test No. | Steel | rate S (L/min) | tration c (vol %) | | (μm) | (/100 μm) | (T) | (W/kg) | bending | bending | Note |
| 1-1 | A | 13 | 1 | 0.17 | 0.46 | 1.7 | 1.930 | 0.700 | A | B | Invention Example |
| 1-2 | A | 15 | 1 | 0.20 | 0.46 | 1.7 | 1.930 | 0.701 | A | A | Invention Example |
| 1-3 | A | 20 | 2 | 0.52 | 0.47 | 2.5 | 1.930 | 0.701 | A | A | Invention Example |
| 1-4 | A | 25 | 3 | 0.98 | 0.46 | 3.3 | 1.929 | 0.702 | A | A | Invention Example |
| 1-5 | A | 25 | 5 | 1.63 | 0.47 | 4.2 | 1.925 | 0.708 | A | A | Invention Example |
| 1-6 | A | 25 | 6 | 1.95 | 0.47 | 5.0 | 1.920 | 0.715 | A | A | Invention Example |
| 1-7 | A | 25 | 8 | 2.60 | 0.51 | 5.8 | 1.920 | 0.716 | A | A | Invention Example |
| 1-8 | A | 25 | 10 | 3.25 | 0.61 | 7.5 | 1.905 | 0.759 | A | A | Comparative Example |
| 1-9 | A | 25 | 15 | 4.88 | 0.65 | 8.3 | 1.902 | 0.792 | A | A | Comparative Example |
| 1-10 | A | 25 | 15 | 9.75 | 0.66 | 10.8 | 1.901 | 0.879 | A | A | Comparative Example |
| 1-11 | A | 25 | 15 | 14.63 | 0.71 | 10.8 | 1.897 | 0.884 | A | A | Comparative Example |
| 1-12 | A | 25 | 15 | 19.50 | 0.70 | 16.7 | 1.890 | 0.901 | A | A | Comparative Example |
| 1-13 | A | 25 | 15 | 24.38 | 0.65 | 18.3 | 1.886 | 0.933 | A | A | Comparative Example |
| 1-14 | B | 13 | 1 | 0.17 | 0.45 | 1.7 | 1.970 | 0.630 | A | B | Invention Example |
| 1-15 | B | 15 | 1 | 0.20 | 0.46 | 1.7 | 1.970 | 0.631 | A | A | Invention Example |
| 1-16 | B | 20 | 2 | 0.52 | 0.47 | 2.5 | 1.970 | 0.631 | A | A | Invention Example |
| 1-17 | B | 25 | 3 | 0.98 | 0.46 | 3.3 | 1.969 | 0.632 | A | A | Invention Example |
| 1-18 | B | 25 | 5 | 1.63 | 0.46 | 4.2 | 1.965 | 0.638 | A | A | Invention Example |
| 1-19 | B | 25 | 6 | 1.95 | 0.47 | 5.0 | 1.960 | 0.645 | A | A | Invention Example |
| 1-20 | B | 25 | 8 | 2.60 | 0.51 | 5.8 | 1.960 | 0.646 | A | A | Invention Example |
| 1-21 | B | 25 | 15 | 4.88 | 0.62 | 8.3 | 1.942 | 0.722 | A | A | Comparative Example |
| 1-22 | B | 25 | 15 | 9.75 | 0.61 | 10.8 | 1.938 | 0.809 | A | A | Comparative Example |
| 1-23 | B | 25 | 15 | 14.63 | 0.62 | 10.8 | 1.937 | 0.814 | A | A | Comparative Example |
| 1-24 | B | 25 | 15 | 19.50 | 0.64 | 16.7 | 1.930 | 0.831 | A | A | Comparative Example |
| 1-25 | B | 25 | 15 | 24.38 | 0.63 | 18.3 | 1.926 | 0.863 | A | A | Comparative Example |
| 1-26 | A | — | — | — | 0.46 | 0 | 1.934 | 0.740 | C | C | Comparative Example |
| 1-27 | B | — | — | — | 0.45 | 0 | 1.970 | 0.660 | C | C | Comparative Example |
| 1-28 | A | 15 | 3 | 3.51 | 0.68 | 5.7 | 1.904 | 0.788 | A | A | Comparative Example |
| 1-29 | A | 18 | 2 | 3.28 | 0.69 | 5.7 | 1.903 | 0.793 | A | A | Comparative Example |

As is clear from Table 1 above, in Test Nos. 1-1 to 1-7 and 1-14 to 1-20 in which the wet blasting conditions were within the range of the present invention, the surface shape of the base steel sheet was within the range of the present invention, and both the magnetic characteristics and the coating adhesion obtained good results. In addition, when Test Nos. 1-1 to 1-7 and 1-14 to 1-20 were compared to each other, Test Nos. 1-14 to 1-20 in which the steel slab had a preferable chemical composition had better magnetic characteristics.

Contrary to this, in comparative examples of Test Nos. 1-8 to 1-13, 1-21 to 1-25, 1-28, and 1-29, the wet blasting conditions were outside of the range of the present invention, and the surface shape of the base steel sheet was also outside of the range of the present invention, so that the magnetic characteristics were particularly inferior. In Test Nos. 1-26 and 1-27, since the wet blasting was not performed, the adhesion of the tension-applying insulation coating was inferior, and coating peeling had already occurred in not only the bent portions but also flat portions other than the bent portions. In addition, compared to invention examples using steels A and B, the iron loss was inferior.

Experimental Example 2

Steel slabs shown in Table 2 below were heated to 1380° C. and hot-rolled to obtain hot-rolled steel sheets having a thickness of 2.3 mm. Some of the steels had cracked and could not proceed to the next step. The hot-rolled steel sheets that could proceed to the next step were annealed at 1120° C. for 20 seconds, and then pickled. However, for Test No. 2-2, pickling was performed without annealing the hot-rolled steel sheet. The steel sheets after the pickling were finished to 0.23 mm by cold rolling to obtain cold-rolled steel sheets. Some of the steels had cracked during the cold rolling and thus could not proceed to the next step. Decarburization annealing was performed on the cold-rolled steel sheets that could proceed to the next step. In such decarburization annealing, each of the cold-rolled steel sheets was heated with a temperature rising rate S1 of 900° C./sec in a temperature raising process at 500° C. or higher and lower than 600° C., and a temperature rising rate S2 of 1600° C./sec (S2/S1=1.78) in a temperature raising process at 600° C. or higher and 700° C. or lower and held at 850° C. for 150 seconds. Thereafter, an annealing separator having a composition consisting of MgO, $Al_2O_3$, and a chloride, having a mixing ratio between MgO and $Al_2O_3$ of 50%:50% (mass ratio 1:1) by mass %, and containing 6 mass % of BiOCl was applied and dried. Thereafter, the decarburization-annealed steel sheet was subjected to final annealing in which the steel sheet was held at 1200° C. for 20 hours.

When the excess annealing separator of the obtained steel sheets was removed by washing with water, no glass coating was formed on any of the steel sheets. Furthermore, when chemical analysis was performed after removing the excess annealing separator by washing with water, any of the steel sheets had a C content of 0.001% or less, a sol. Al content of 0.005% or less, a S+Se content of 0.005% or less, and a N content of 0.005% or less. The Si content was the same as in the slab stage, the Mn content was 0.050% to 1.000%, and the Bi+Te+Pb (total amount) was 0% to 0.0300%. The amounts of Sb, Sn, and Cr were 0% to 0.04%, and the Cu content was 0% to 0.05%.

A test piece was cut out from the steel sheet from which the excess annealing separator was removed by washing with water, and subjected to stress relieving annealing. Thereafter, alumina abrasive particles having a center particle size of 50 μm using water as a solvent were formed into a slurry, and the slurry was projected onto both surfaces of the steel sheet by wet blasting while fixing the conditions to a nozzle movement speed v of 200 mm/sec, a nozzle width w of 250 mm, a slurry flow rate S of 15 l/min, and an abrasive concentration c of 1 vol % ((S×c×ρ/(6×v×W)) =0.20). In Test No. 2-24 shown below, wet blasting was not performed, and the surface state was a smooth surface. Thereafter, an aqueous solution containing aluminum phosphate and colloidal silica as primary components was applied, and baked at 850° C. for 1 minute, whereby a tension-applying insulation coating having a coating amount of 4.5 g/m² was formed on the surface of the test piece.

For each of the obtained test pieces, the magnetic characteristics, the surface shape of the base steel sheet, and the adhesion of the tension-applying insulation coating were evaluated. A method for evaluating the surface shape of the base steel sheet and the adhesion of the tension-applying insulation coating was the same as in Experimental Example 1. The magnetic characteristics were evaluated as follows. The obtained results are summarized in Table 3 below.

[Magnetic Characteristics]

The magnetic characteristics in the rolling direction were evaluated by the method for measuring magnetic characteristics using a single sheet tester specified in JIS C 2556 (2015). At the time of evaluation, the magnetic flux density B8 (magnetic flux density at 800 A/m) was measured, and a condition where a value of more than 1.90 T was obtained was determined that good secondary recrystallization was developed, and the test piece was irradiated with a laser beam to perform a magnetic domain refining treatment. Thereafter, the iron loss W17/50 (iron loss when magnetized at 1.7 T at 50 Hz) after the laser irradiation was evaluated.

TABLE 2

| Steel No. | Chemical composition (mass %, remainder consists of Fe and impurities) | | | | | | | | | | | | | | | |
| --- | --- | --- | --- | --- | --- | --- | --- | --- | --- | --- | --- | --- | --- | --- | --- | --- |
| | C | Si | Mn | S | Se | S + Se | sol. Al | N | Bi | Te | Pb | Bi + Te + Pb | Sb | Sn | Cr | Cu |
| A-1 | 0.079 | 3.31 | 0.080 | 0.022 | 0.001 | 0.023 | 0.025 | 0.008 | — | — | — | — | — | — | — | — |
| A-2 | 0.078 | 3.51 | 0.077 | 0.002 | 0.051 | 0.053 | 0.024 | 0.008 | — | — | — | — | — | — | — | — |
| A-3 | 0.082 | 3.31 | 0.080 | 0.001 | 0.023 | 0.024 | 0.025 | 0.008 | 0.0025 | — | — | 0.0025 | — | — | — | — |
| A-4 | 0.082 | 3.31 | 0.080 | 0.020 | 0.006 | 0.026 | 0.025 | 0.008 | 0.0025 | — | — | 0.0025 | — | — | — | — |
| A-5 | 0.081 | 3.22 | 0.075 | 0.021 | 0.002 | 0.023 | 0.025 | 0.009 | — | 0.0015 | — | 0.0015 | — | — | — | — |
| A-6 | 0.080 | 3.32 | 0.080 | 0.019 | 0.003 | 0.022 | 0.026 | 0.008 | — | — | 0.0015 | 0.0015 | — | — | — | — |
| A-7 | 0.079 | 3.31 | 0.080 | 0.022 | 0.001 | 0.023 | 0.025 | 0.009 | 0.0026 | 0.0005 | — | 0.0031 | — | — | — | — |
| A-8 | 0.078 | 3.51 | 0.077 | 0.001 | 0.018 | 0.019 | 0.024 | 0.008 | — | 0.0018 | 0.0011 | 0.0029 | — | — | — | — |
| A-9 | 0.079 | 3.22 | 0.080 | 0.019 | 0.003 | 0.022 | 0.025 | 0.009 | 0.0021 | — | 0.0015 | 0.0036 | — | — | — | — |
| A-10 | 0.080 | 3.31 | 0.080 | 0.001 | 0.022 | 0.023 | 0.025 | 0.008 | 0.0018 | 0.0018 | 0.0018 | 0.0054 | — | — | — | — |
| A-11 | 0.085 | 3.31 | 0.080 | 0.022 | 0.001 | 0.023 | 0.025 | 0.008 | 0.0141 | 0.0018 | 0.0012 | 0.0171 | — | — | — | — |
| A-12 | 0.071 | 4.05 | 0.081 | 0.019 | 0.051 | 0.070 | 0.025 | 0.008 | — | — | — | — | — | — | — | — |
| A-13 | 0.071 | 2.41 | 0.081 | 0.019 | 0.001 | 0.020 | 0.025 | 0.008 | — | — | — | — | — | — | — | — |
| A-14 | 0.008 | 3.28 | 0.075 | 0.022 | 0.006 | 0.028 | 0.021 | 0.008 | — | — | — | — | — | — | — | — |
| A-15 | 0.209 | 3.15 | 0.051 | 0.021 | 0.006 | 0.027 | 0.031 | 0.006 | — | — | — | — | — | — | — | — |
| A-16 | 0.061 | 3.31 | 0.081 | 0.012 | 0.003 | 0.015 | 0.009 | 0.009 | — | — | — | — | — | — | — | — |
| A-17 | 0.061 | 3.29 | 0.082 | 0.015 | 0.003 | 0.018 | 0.075 | 0.009 | — | — | — | — | — | — | — | — |
| A-18 | 0.072 | 3.19 | 0.008 | 0.051 | 0.001 | 0.052 | 0.018 | 0.008 | — | — | — | — | — | — | — | — |
| A-19 | 0.073 | 3.18 | 1.01 | 0.051 | 0.00 | 0.052 | 0.015 | 0.009 | — | — | — | — | — | — | — | — |
| A-20 | 0.071 | 3.25 | 0.081 | 0.003 | 0.001 | 0.004 | 0.025 | 0.008 | — | — | — | — | — | — | — | — |
| A-21 | 0.071 | 3.19 | 0.051 | 0.095 | 0.001 | 0.096 | 0.019 | 0.008 | — | — | — | — | — | — | — | — |
| A-22 | 0.085 | 3.31 | 0.082 | 0.052 | 0.002 | 0.054 | 0.023 | 0.023 | — | — | — | — | — | — | — | — |
| A-23 | 0.085 | 3.31 | 0.052 | 0.052 | 0.002 | 0.054 | 0.023 | 0.002 | — | — | — | — | — | — | — | — |
| A-24 | 0.081 | 3.22 | 0.075 | 0.021 | 0.002 | 0.023 | 0.025 | 0.009 | — | 0.0015 | — | 0.0015 | 0.03 | — | — | — |
| A-25 | 0.080 | 3.32 | 0.080 | 0.019 | 0.003 | 0.022 | 0.026 | 0.008 | — | — | 0.0015 | 0.0015 | — | 0.03 | — | — |
| A-26 | 0.079 | 3.31 | 0.080 | 0.022 | 0.001 | 0.023 | 0.025 | 0.009 | 0.0026 | 0.0005 | — | 0.0031 | — | — | 0.04 | — |
| A-27 | 0.078 | 3.51 | 0.077 | 0.001 | 0.018 | 0.019 | 0.024 | 0.008 | — | 0.0018 | 0.0011 | 0.0029 | — | — | — | 0.05 |
| A-28 | 0.079 | 3.22 | 0.080 | 0.019 | 0.003 | 0.022 | 0.025 | 0.009 | 0.0021 | — | 0.0015 | 0.0036 | — | 0.04 | 0.04 | 0.04 |

TABLE 3

| Test No. | Steel No. | Surface shape Ra (μm) | Surface shape Number of recessed parts (/100 μm) | Magnetic flux density B8 (T) | Iron loss W17/50 (W/kg) | Adhesion φ20 bending | Adhesion φ10 bending | Note |
|---|---|---|---|---|---|---|---|---|
| 2-1 | A-1 | 0.46 | 1.5 | 1.934 | 0.704 | A | A | Invention Example |
| 2-2 | A-2 | 0.46 | 1.7 | 1.931 | 0.709 | A | A | Invention Example |
| 2-3 | A-3 | 0.47 | 1.5 | 1.975 | 0.625 | A | A | Invention Example |
| 2-4 | A-4 | 0.46 | 1.6 | 1.975 | 0.628 | A | A | Invention Example |
| 2-5 | A-5 | 0.47 | 1.7 | 1.975 | 0.631 | A | A | Invention Example |
| 2-6 | A-6 | 0.46 | 1.7 | 1.971 | 0.641 | A | A | Invention Example |
| 2-7 | A-7 | 0.46 | 1.8 | 1.972 | 0.634 | A | A | Invention Example |
| 2-8 | A-8 | 0.41 | 1.5 | 1.972 | 0.635 | A | A | Invention Example |
| 2-9 | A-9 | 0.42 | 1.6 | 1.976 | 0.621 | A | A | Invention Example |
| 2-10 | A-10 | 0.44 | 1.2 | 1.977 | 0.615 | A | A | Invention Example |
| 2-11 | A-11 | 0.43 | 1.6 | 1.978 | 0.612 | A | A | Invention Example |
| 2-12 | A-12 | | | Cracked in cold rolling | | | | Comparative Example |
| 2-13 | A-13 | 0.51 | 1.7 | 1.671 | — | A | A | Comparative Example |
| 2-14 | A-14 | 0.45 | 1.6 | 1.651 | — | A | A | Comparative Example |
| 2-15 | A-15 | 0.46 | 1.5 | 1.711 | — | A | A | Comparative Example |
| 2-16 | A-16 | 0.47 | 1.5 | 1.681 | — | A | A | Comparative Example |
| 2-17 | A-17 | | | Cracked in cold rolling | | | | Comparative Example |
| 2-18 | A-18 | 0.46 | 1.6 | 1.712 | — | A | A | Comparative Example |
| 2-19 | A-19 | 0.47 | 1.7 | 1.691 | — | A | A | Comparative Example |
| 2-20 | A-20 | 0.51 | 1.8 | 1.715 | — | A | A | Comparative Example |
| 2-21 | A-21 | | | Cracked in hot rolling | | | | Comparative Example |
| 2-22 | A-22 | | | Cracked in cold rolling | | | | Comparative Example |
| 2-23 | A-23 | 0.51 | 1.8 | 1.731 | — | A | A | Comparative Example |
| 2-24 | A-1 | 0.45 | 0 | 1.931 | 0.751 | C | C | Comparative Example |
| 2-25 | A-24 | 0.48 | 1.8 | 1.976 | 0.629 | A | A | Invention Example |
| 2-26 | A-25 | 0.45 | 1.8 | 1.972 | 0.639 | A | A | Invention Example |
| 2-27 | A-26 | 0.47 | 1.7 | 1.973 | 0.633 | A | A | Invention Example |
| 2-28 | A-27 | 0.42 | 1.4 | 1.973 | 0.634 | A | A | Invention Example |
| 2-29 | A-28 | 0.43 | 1.8 | 1.977 | 0.620 | A | A | Invention Example |

As is clear from Table 3, in Test No. 2-12, since the Si content exceeded the upper limit of the present invention, fracture had occurred during cold rolling. In Test No. 2-13, since the Si content was lower than the lower limit of the present invention, the magnetic characteristics were inferior. In Test No. 2-14, the C content was lower than the lower limit of the present invention, and in Test No. 2-15, the C content exceeded the upper limit of the present invention, so that both were inferior in magnetic characteristics. In Test No. 2-16, the amount of acid-soluble Al was lower than the lower limit of the present invention, and the magnetic characteristics were inferior. In Test No. 2-17, the amount of the acid-soluble Al exceeded the upper limit of the present invention, and fracture had occurred during cold rolling. In Test No. 2-18, the Mn content was lower than the lower limit of the present invention, and in Test No. 2-19, the Mn content exceeded the upper limit of the present invention, so that both were inferior in magnetic characteristics. In Test No. 2-20, the total amount of S+Se was lower than the lower limit of the present invention, and the magnetic characteristics were inferior. In Test No. 2-21, the total amount of S+Se exceeded the upper limit of the present invention, and cracking had occurred during hot rolling. In Test No. 2-22, the N content exceeded the upper limit of the present invention, and cracking had occurred during cold rolling. In Test No. 2-23, the N content was lower than the lower limit of the present invention, and the magnetic characteristics were inferior. In Test No. 2-24, since wet blasting was not performed, the coating adhesion was inferior, and coating peeling had already occurred in not only the bent portions but also flat portions other than the bent portions. In addition, compared to other test numbers (2-1 to 2-11) in which laser irradiation was performed, the iron loss was inferior.

Contrary to this, in Test Nos. 2-1 to 2-11 and 2-25 to 2-29 in which the chemical composition was within the range of the present invention, the surface shape of the base steel sheet was within the range of the present invention, and both the magnetic characteristics and the coating adhesion showed good results. In addition, Test Nos. 2-3 to 2-11 and 2-25 to 2-29 in which the steel slab had a preferable chemical composition had superior magnetic characteristics to Test No. 2-1.

Experimental Example 3

The steel slabs shown in Table 4 below were heated to 1380° C. and hot-rolled to obtain hot-rolled steel sheets having a thickness of 2.3 mm. Thereafter, the hot-rolled steel sheets were annealed at 1120° C. for 120 seconds, and then pickled. The steel sheets after the pickling were cold rolled to 0.23 mm to obtain cold-rolled steel sheets. Thereafter, decarburization annealing was performed on the obtained cold-rolled steel sheets. In this case, the cold-rolled steel sheets were heated by changing each of the temperature rising rate S1 (° C./sec) in the temperature raising process at 500° C. or higher and lower than 600° C. and the temperature rising rate S2 (° C./sec) in the temperature raising process at 600° C. or higher and 700° C. or lower, and held at 850° C. for 150 seconds. Thereafter, an annealing separator was applied and dried, and subjected to final annealing of performing holding at 1200° C. for 20 hours. The following five kinds of annealing separators were used.

(A) Annealing separator containing MgO and $Al_2O_3$ in a mixing ratio of 50%:50% by mass % and containing 5 mass % of BiOCl (B) Annealing separator containing MgO and $Al_2O_3$ in a mixing ratio of 80%:20% by mass % and containing 5 mass % of BiOCl (C) Annealing separator containing MgO and $Al_2O_3$ in a mixing ratio of 20%:80% by mass % and containing 5 mass % of BiOCl (D) Annealing separator containing MgO and $Al_2O_3$ in a mixing ratio of 80%:20% by mass % and not containing BiOCl (E) Annealing separator containing MgO and $Al_2O_3$ in a mixing ratio of 20%:80% by mass % and not containing BiOCl When the excess annealing separator of the obtained steel sheets was removed by washing with water, no glass coating was formed on the steel sheet in which the annealing separator A was used. The steel sheets in which the annealing separators B, C, D, and E were used did not have a smooth surface due to the glass coating formed on the surface or alumina baked on the surface. When the steel sheets in which the annealing separator A was used were subjected to chemical analysis after removing the excess annealing separator by washing with water, any of the steel sheets had a C content of 0.001% or less, a sol. Al content of 0.005% or less, a S content of 0.005% or less, and a N content of 0.005% or less. The Si content was the same as in the slab stage, the Mn content was 0.050% to 0.082%, and the Bi+Te+Pb (total amount) was 0% to 0.0300%.

A test piece was cut out from the steel sheet from which the excess annealing separator was removed by washing with water, and subjected to stress relieving annealing. Thereafter, alumina abrasive particles having a center particle size of 50 μm using water as a solvent were formed into a slurry, and the slurry was projected onto both surfaces of the steel sheet by wet blasting while fixing the conditions of a nozzle movement speed v of 200 mm/sec and a nozzle width w of 250 mm and changing the flow rate S of the slurry and the abrasive concentration c. In Test No. 3-17 shown below, wet blasting was not performed, and the surface properties were smooth surfaces. Thereafter, an aqueous solution containing aluminum phosphate and colloidal silica as primary components was applied, and baked at 850° C. for 1 minute, whereby a tension-applying insulation coating having a coating amount of 4.5 g/m² was formed on the surface of the test piece. The obtained test piece was irradiated with a laser beam to perform a magnetic domain refining treatment.

TABLE 4

| Steel No. | Chemical composition (mass %, remainder consists of Fe and impurities) | | | | | | | | | |
|---|---|---|---|---|---|---|---|---|---|---|
| | C | Si | Mn | S | sol. Al | N | Bi | Te | Pb | Bi + Te + Pb |
| B-1 | 0.079 | 3.34 | 0.080 | 0.022 | 0.025 | 0.008 | — | — | — | — |
| B-2 | 0.079 | 3.32 | 0.080 | 0.022 | 0.025 | 0.008 | 0.0015 | — | — | 0.0015 |
| B-3 | 0.078 | 3.31 | 0.081 | 0.023 | 0.024 | 0.008 | — | 0.0018 | — | 0.0018 |
| B-4 | 0.078 | 3.34 | 0.082 | 0.022 | 0.025 | 0.008 | — | — | 0.0011 | 0.0011 |
| B-5 | 0.078 | 3.34 | 0.081 | 0.021 | 0.025 | 0.008 | 0.0012 | — | 0.0014 | 0.0026 |
| B-6 | 0.079 | 3.31 | 0.082 | 0.022 | 0.025 | 0.008 | — | 0.0018 | 0.0015 | 0.0033 |
| B-7 | 0.078 | 3.32 | 0.082 | 0.023 | 0.025 | 0.008 | 0.0012 | 0.0006 | 0.0015 | 0.0033 |

Each of the obtained test pieces was evaluated from the viewpoint of magnetic characteristics, the surface shape of the base steel sheet, and the adhesion of the tension-applying insulation coating. The evaluation method was the same as in Experimental Example 1. The obtained results are summarized in Table 5 below.

TABLE 5

| Test No. | Steel No. | Decarburization annealing conditions | | | Annealing separator | Wet blasting conditions | | | Surface shape | | Magnetic flux density B8 (T) | Iron loss W17/50 (W/kg) | Adhesion | | Note |
|---|---|---|---|---|---|---|---|---|---|---|---|---|---|---|---|
| | | S1 (° C./s) | S2 (° C./s) | S2/S1 | | Slurry flow rate S (L/min) | Abrasive concentration c (vol %) | (S × c × p)/(6 × v × W) | Ra (μm) | Number of recessed parts (/100 μm) | | | φ20 bending | φ10 bending | |
| 3-1 | B-1 | 280 | 950 | 3.39 | A | 13 | 1 | 0.17 | 0.46 | 1.7 | 1.925 | 0.721 | A | B | Invention Example |
| 3-2 | | 400 | 950 | 2.38 | A | 13 | 1 | 0.17 | 0.46 | 1.7 | 1.928 | 0.722 | A | A | Invention Example |
| 3-3 | | 280 | 1600 | 5.71 | A | 13 | 1 | 0.17 | 0.47 | 1.5 | 1.935 | 0.711 | A | A | Invention Example |
| 3-4 | B-2 | 280 | 950 | 3.39 | A | 13 | 1 | 0.17 | 0.46 | 1.6 | 1.958 | 0.649 | A | A | Invention Example |
| 3-5 | | 400 | 950 | 2.38 | A | 13 | 1 | 0.17 | 0.47 | 1.7 | 1.956 | 0.655 | A | A | Invention Example |
| 3-6 | | 400 | 2000 | 5.00 | A | 13 | 1 | 0.17 | 0.46 | 1.7 | 1.978 | 0.611 | A | A | Invention Example |
| 3-7 | | 700 | 2000 | 2.86 | A | 13 | 1 | 0.17 | 0.46 | 1.8 | 1.978 | 0.605 | A | A | Invention Example |
| 3-8 | B-3 | 700 | 2000 | 2.86 | A | 13 | 1 | 0.17 | 0.46 | 1.7 | 1.978 | 0.601 | A | A | Invention Example |
| 3-9 | B-4 | 700 | 1600 | 2.29 | A | 13 | 1 | 0.17 | 0.47 | 1.5 | 1.977 | 0.618 | A | A | Invention Example |
| 3-10 | B-5 | 700 | 1600 | 2.29 | A | 13 | 1 | 0.17 | 0.46 | 1.6 | 1.976 | 0.614 | A | A | Invention Example |
| 3-11 | B-6 | 700 | 1600 | 2.29 | A | 13 | 1 | 0.17 | 0.47 | 1.7 | 1.977 | 0.612 | A | A | Invention Example |
| 3-12 | B-7 | 700 | 1600 | 2.29 | A | 13 | 1 | 0.17 | 0.46 | 1.7 | 1.976 | 0.611 | A | A | Invention Example |
| 3-13 | B-1 | 280 | 950 | 3.39 | B | 25 | 15 | 4.88 | 0.65 | 8.3 | 1.901 | 0.798 | A | A | Comparative Example |
| 3-14 | | 400 | 1600 | 4.00 | C | 25 | 15 | 4.88 | 0.66 | 8.5 | 1.898 | 0.801 | A | A | Comparative Example |
| 3-15 | B-3 | 280 | 950 | 3.39 | D | 25 | 15 | 4.88 | 0.68 | 8.7 | 1.923 | 0.741 | A | A | Comparative Example |

TABLE 5-continued

| Test No. | Steel No. | Decarburization annealing conditions S1 (° C./S) | S2 (° C./s) | S2/S1 | Annealing separator | Wet blasting conditions Slurry flow rate S (L/min) | Abrasive concentration c (vol %) | (S × c × p)/(6 × v × W) | Ra (μm) | Surface shape Number of recessed parts (/100 μm) | Magnetic flux density B8 (T) | Iron loss W17/50 (W/kg) | Adhesion φ20 bending | φ10 bending | Note |
|---|---|---|---|---|---|---|---|---|---|---|---|---|---|---|---|
| 3-16 | B-1 | 700 | 1600 | 2.29 | E | 25 | 15 | 4.88 | 0.68 | 8.1 | 1.898 | 0.795 | A | A | Comparative Example |
| 3-17 | | 700 | 1600 | 2.29 | A | | Absent | | 0.46 | 0 | 1.931 | 0.753 | C | C | Comparative Example |
| 3-18 | | 700 | 1600 | 2.29 | A | 25 | 15 | 4.88 | 0.68 | 8.7 | 1.905 | 0.781 | A | A | Comparative Example |
| 3-19 | | 600 | 350 | 0.58 | A | 13 | 1 | 0.17 | 0.46 | 1.8 | 1.921 | 0.735 | A | B | Invention Example |
| 3-20 | | 700 | 1600 | 2.29 | A | 3 | 1 | 0.04 | 0.46 | 0.2 | 1.928 | 0.755 | C | C | Comparative Example |

Test Nos. 3-13 to 3-16 in which the annealing separator was outside of the range of the present invention did not have a smooth surface due to the glass coating formed on the surface or alumina baked on the surface. In order to remove the glass coating or alumina, it was necessary to increase the projection amount in the wet blasting. However, since the wet blasting conditions were outside of the range of the present invention, the surface shape of the base steel sheet was outside of the range of the present invention, so that the magnetic characteristics were inferior. In Test Nos. 3-17 and 3-18, the annealing separator was within the range of the present invention, no glass coating was formed on the surface after the above-mentioned washing with water, and the surface had a smooth surface. In Test No. 3-17, since the wet blasting was not performed, the coating adhesion was inferior, and coating peeling had already occurred in not only the bent portions but also flat portions other than the bent portions. In Test No. 3-18, the wet blasting conditions exceeded the upper limit of the present invention, the surface shape was not within the range of the present invention, and the magnetic characteristics were inferior. In Test No. 3-19, the conditions during decarburization annealing were outside of the more preferable range of the present invention, and the magnetic characteristics were slightly inferior to those of the other examples. In Test No. 3-20, the wet blasting conditions were lower than the lower limit, and the coating adhesion was inferior.

Contrary to this, in Test Nos. 3-1 to 3-12 in which the annealing separator was within the range of the present invention, no glass coating was formed on the surface after the above-mentioned washing with water, and the surface had a smooth surface. Furthermore, since the wet blasting conditions were within the range of the present invention, the surface shape of the base steel sheet was within the range of the present invention, and excellent magnetic characteristics and coating adhesion were exhibited. When Test Nos. 3-1 to 3-3, 3-4 to 3-7 and 3-8 to 3-12 were compared to each other, Test Nos. 3-4 to 3-12 in which the steel slab has a preferable chemical composition had excellent magnetic characteristics, and Test Nos. 3-6 to 12 in which the temperature rising rate S1 (° C./sec) in the temperature raising process at 500° C. or higher and lower than 600° C. and the temperature rising rate S2 (° C./sec) in the temperature raising process at 600° C. or higher and 700° C. or lower during the decarburization annealing were within the preferable range had more excellent magnetic characteristics.

While the preferred embodiments of the present invention have been described in detail with reference to the accompanying drawings, but the present invention is not limited to such examples. It is obvious that those skilled in the art to which the present invention pertains can conceive various changes or modifications within the scope of the technical idea described in the claims, and it is understood that these also naturally belong to the technical scope of the present invention.

BRIEF DESCRIPTION OF THE REFERENCE SYMBOLS

10 Grain-oriented electrical steel sheet
11 Base steel sheet
13 Tension-applying insulation coating
101 Recessed part

What is claimed is:
1. A grain-oriented electrical steel sheet comprising:
a base steel sheet including, as a chemical composition, by mass %,
C: 0.010% or less,
Si: 2.50% to 4.00%,
Mn: 0.050% to 1.000%,
S+Se: 0.005% or less in total,
Sol. Al: 0.005% or less,
N: 0.005% or less,
Bi+Te+Pb: 0.0005% to 0.0300% in total,
Sb: 0% to 0.50%,
Sn: 0% to 0.50%,
Cr: 0% to 0.50%,
Cu: 0% to 1.0%, and
a remainder of Fe and impurities; and
a tension-applying insulation coating provided on a surface of the base steel sheet,
wherein, on the surface of the base steel sheet, an arithmetic average roughness Ra along a rolling 90° direction, said rolling 90° direction being a direction perpendicular to a rolling direction is 0.60 μm or less, and
a cross section of the base steel sheet is observed along the rolling 90° direction, recessed parts having a depth of 0.1 μm or more and 2.0 μm or less are present on the surface of the base steel sheet in 1.0/100 μm or more and 6.0/100 μm or less.

2. A method for producing a grain-oriented electrical steel sheet, comprising:
a hot rolling step of heating a steel piece and thereafter hot-rolling the steel piece to obtain a hot-rolled steel sheet, the steel piece including, by mass %, C: 0.020% to 0.100%, Si: 2.50% to 4.00%, Mn: 0.050% to 1.000%, S+Se: 0.005% to 0.080% in total, Sol. Al: 0.010% to 0.070%, N: 0.005% to 0.020%, Bi+Te+Pb: 0.0005% to 0.0300% in total, Sb: 0% to 0.50%, Sn: 0% to 0.50%, Cr: 0% to 0.50%, Cu: 0% to 1.0%, and a remainder of Fe and impurities;
a hot-rolled sheet annealing step of optionally annealing the hot-rolled steel sheet to obtain a hot-rolled and annealed steel sheet;
a cold rolling step of performing one cold rolling or a plurality of cold rollings with intermediate annealing therebetween on the obtained hot-rolled steel sheet or hot-rolled and the annealed steel sheet, to obtain a cold-rolled steel sheet;
a decarburization annealing step of performing decarburization annealing on the cold-rolled steel sheet to obtain a decarburization-annealed steel sheet;
a final annealing step of applying an annealing separator to the decarburization-annealed steel sheet and thereafter performing final annealing;
a surface processing step of performing surface processing by wet blasting under conditions satisfying the following Formula (1) on an entire surface of the steel sheet after the final annealing step in a sheet width direction; and
an insulation coating forming step of forming a tension-applying insulation coating on the surface of the steel sheet after the surface processing step,
wherein the annealing separator contains MgO and $Al_2O_3$ as primary components in a mass ratio $MgO:Al_2O_3$ between the MgO and the $Al_2O_3$ in a range of 3:7 to 7:3, and contains 0.5 to 15 mass % of bismuth chloride, $$0.15 \leq (S \times c \times \rho/(6 \times v \times W) \leq 3.00 \qquad \text{Formula (1)}$$

where, in the Formula (1),
S: a flow rate (L/min) of a slurry used for the wet blasting
c: a concentration (vol %) of an abrasive used for the wet blasting
$\rho$: a density ($kg/m^3$) of the abrasive used for the wet blasting
v: a relative speed (mm/sec) between a nozzle from which the slurry is discharged and the steel sheet
W: a width (mm) of the nozzle from which the slurry is discharged.

3. The method for producing a grain-oriented electrical steel sheet according to claim 2,
wherein, in the decarburization annealing step, a temperature rising rate S1 in a temperature range of 500° C. or higher and lower than 600° C. and a temperature rising rate S2 in a temperature range of 600° C. or higher and 700° C. or lower satisfy each of the following Formulas (2) to (4), $$300 \leq S1 \leq 1000 \qquad \text{Formula (2)}$$

$$1000 \leq S2 \leq 3000 \qquad \text{Formula (3)}$$

$$1.0 < S2/S1 \leq 10.0 \qquad \text{Formula (4).}$$

* * * * *